United States Patent
Rice et al.

(10) Patent No.: US 7,162,786 B2
(45) Date of Patent: *Jan. 16, 2007

(54) METHOD AND APPARATUS FOR RECYCLING OIL FILTERS

(76) Inventors: Edwin E. Rice, 2100 W. Delhi Rd., Ann Arbor, MI (US) 48103; Charles H. Franklin, 1902 Longshore Dr., Ann Arbor, MI (US) 48105

(*) Notice: Subject to any disclaimer, the term of this patent is extended or adjusted under 35 U.S.C. 154(b) by 154 days.

This patent is subject to a terminal disclaimer.

(21) Appl. No.: 10/913,187

(22) Filed: Aug. 6, 2004

(65) Prior Publication Data

US 2005/0005414 A1    Jan. 13, 2005

Related U.S. Application Data

(63) Continuation-in-part of application No. 10/006,587, filed on Dec. 5, 2001, now Pat. No. 6,772,497.

(51) Int. Cl.
*B23P 19/02* (2006.01)
*B23P 19/00* (2006.01)
*B30B 5/00* (2006.01)

(52) U.S. Cl. ............... 29/426.4; 29/564.3; 29/426.5; 29/700; 100/39; 100/902; 100/98 R; 100/240

(58) Field of Classification Search ............ 29/564.3, 29/403.3, 426.4, 426.5, 426.3; 100/902, 100/131, 125
See application file for complete search history.

(56) References Cited

U.S. PATENT DOCUMENTS

| | | | |
|---|---|---|---|
| 4,396,340 A * | 8/1983 | Clinton .................. 414/412 |
| 5,136,934 A * | 8/1992 | Darby, Jr. .............. 100/125 |
| 5,214,830 A | 6/1993 | Rozycki |
| 5,274,906 A * | 1/1994 | ter Haar ................. 29/700 |
| 5,279,215 A | 1/1994 | Harder |
| 5,299,352 A | 4/1994 | Klenk |
| 5,327,822 A | 7/1994 | Koenig |
| 5,331,888 A | 7/1994 | Brown, Jr. |
| 5,383,397 A | 1/1995 | Battles et al. |
| 5,406,691 A * | 4/1995 | Thorne ................. 29/564.3 |
| 5,447,573 A | 9/1995 | Christensen |
| 5,678,478 A | 10/1997 | Goyal et al. |
| 5,735,197 A | 4/1998 | Kleine |
| 5,857,407 A | 1/1999 | Gross et al. |

* cited by examiner

*Primary Examiner*—David P. Bryant
*Assistant Examiner*—Sarang Afzali
(74) *Attorney, Agent, or Firm*—Ian C. McLeod; Steven E. Merritt

(57) ABSTRACT

An apparatus for automatically feeding an oil filter(s) into a crushing zone to shear a canister from a connector plate. The apparatus feed the oil filters into the crushing zone one at a time for the crushing by a movable wall against a fixed wall (211) to flatten the canister while blade shears the canister from the connector plate. The apparatus enables capture of oil and recycling of the canister and connector plate.

18 Claims, 21 Drawing Sheets

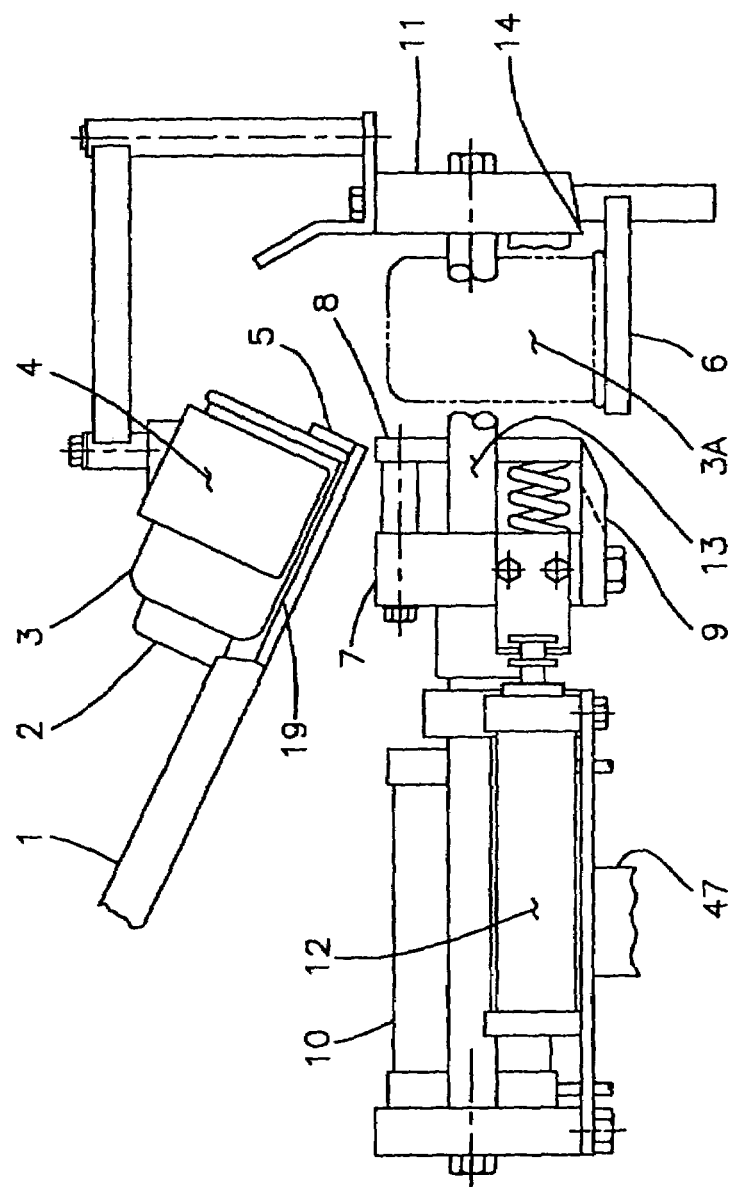
FIG. 1
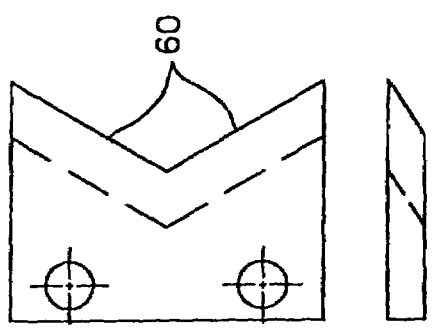
FIG. 1A
FIG 1B

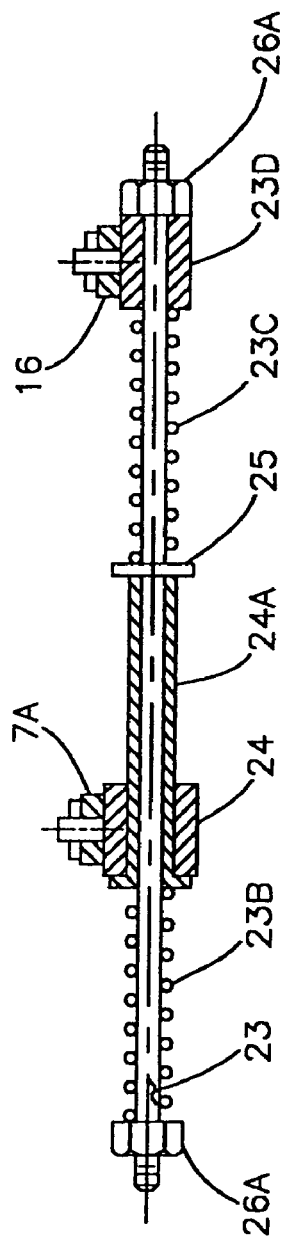
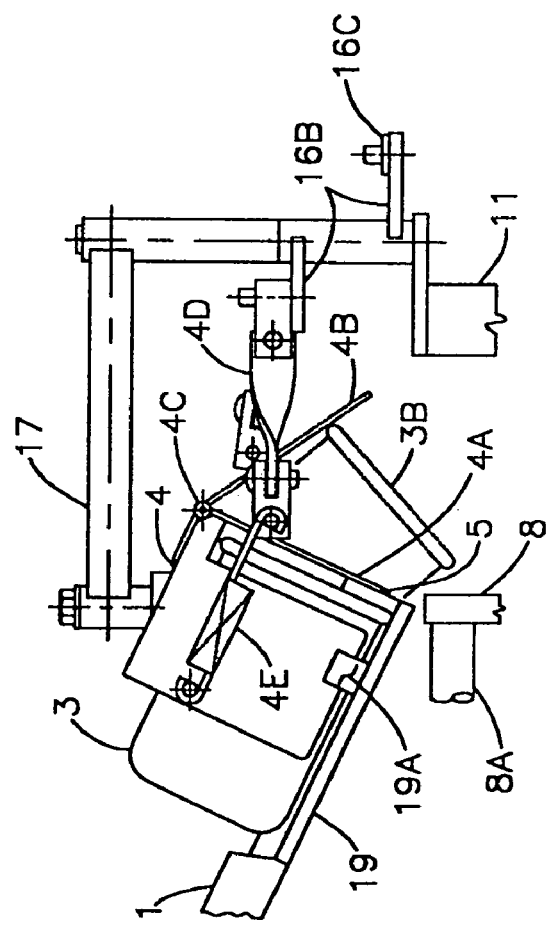
FIG. 10
FIG. 11

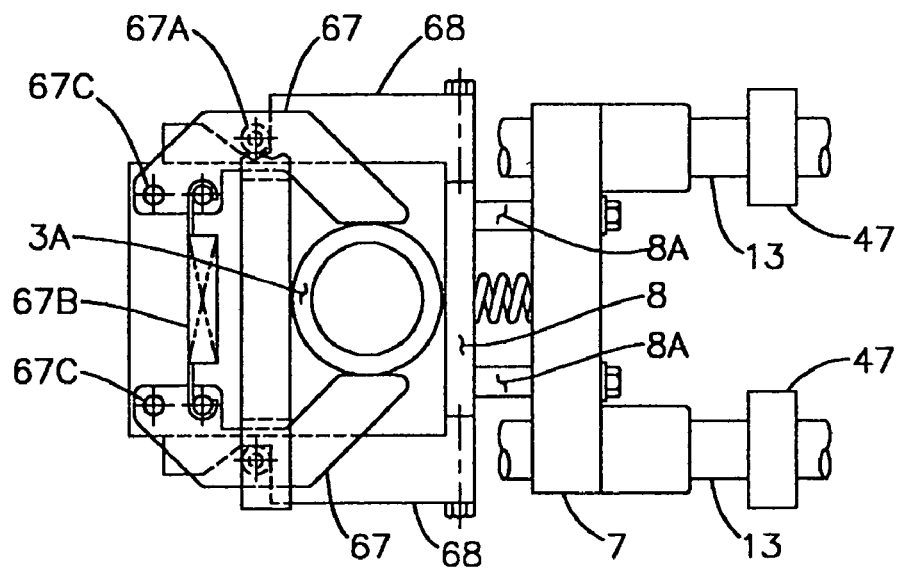
FIG. 13A
FIG. 13B
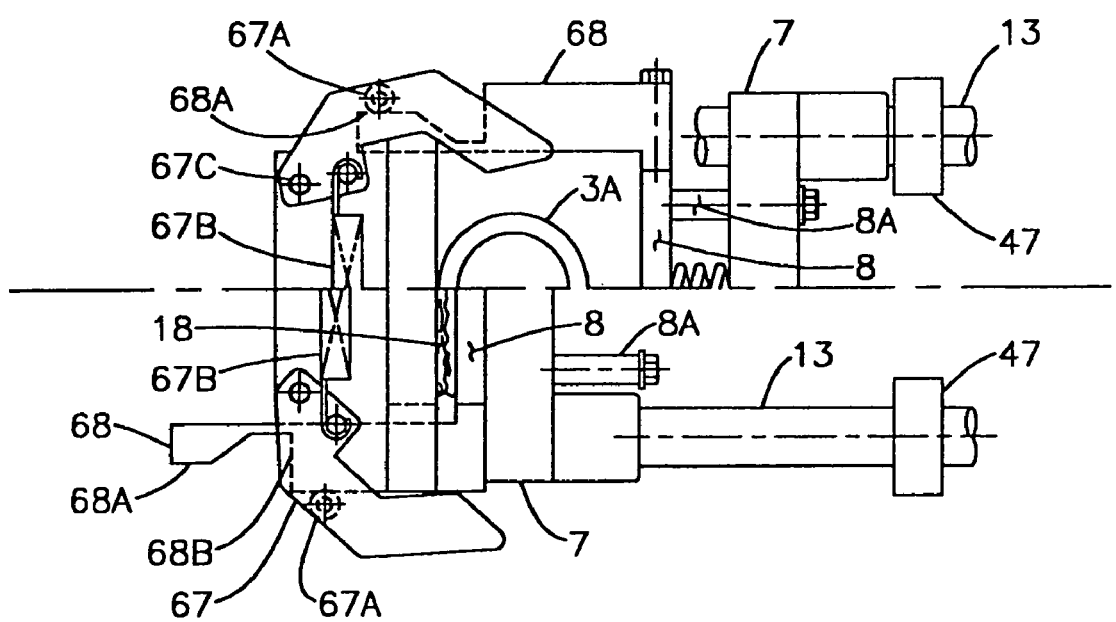
FIG. 13C

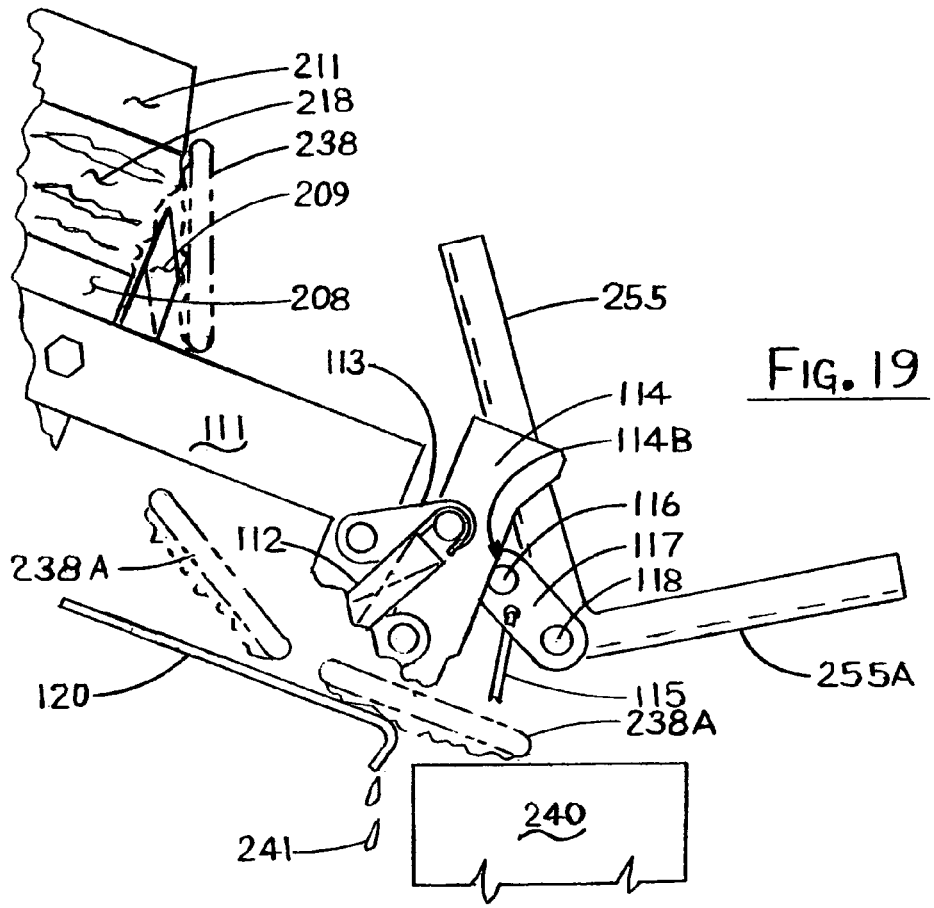
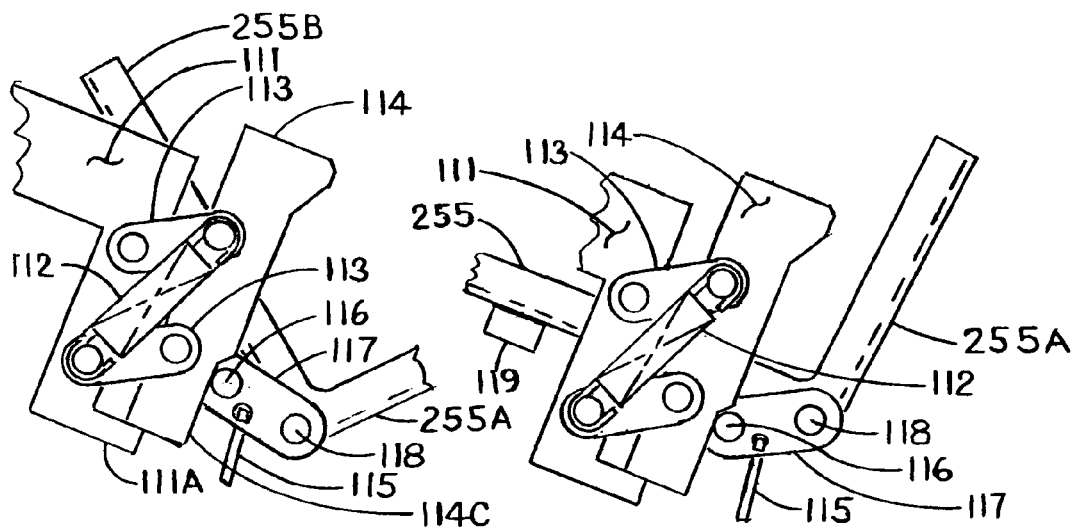
Fig. 19
Fig. 20
Fig. 21

METHOD AND APPARATUS FOR RECYCLING OIL FILTERS

CROSS-REFERENCE TO RELATED APPLICATION

This application is a continuation-in-part of application Ser. No. 10/006,587, filed Dec. 5, 2001 now U.S. Pat. No. 6,772,497.

STATEMENT REGARDING FEDERALLY SPONSORED RESEARCH OR DEVELOPMENT

Not Applicable

REFERENCE TO A "COMPUTER LISTING APPENDIX SUBMITTED ON A COMPACT DISC"

Not Applicable.

BACKGROUND OF THE INVENTION (1) Field of the Invention

The invention relates to a method for automatically processing multiple used oil filters used for internal combustion engines for disposal, in particular for disposal in which essentially all of the residual oil is removed making the crushed canister and internal element a non-hazardous material and making the connector base plate available for recycling as scrap steel.

(2) Description of Related Art

Many state governments have classified used automotive and truck oil filters with substantial amounts of retained oil as a hazardous waste material causing a high disposal cost. A number of states have statutes that provide for special hazardous waste sites for landfill of these materials with substantial charges for their use. There is also a potential generator liability where filters have been disposed of without removing essentially all the retained oil.

Methods have been devised for removing residual oil from used filters and for removing the base plate. However, the more common method in general use for removing the oil involves crushing the filter axially with the base plate intact. Most filters are constructed with a check valve in conjunction with the base plate preventing free flow of oil out of the filter assembly during axial crushing thus leaving a substantial amount of oil. The methods devised for removing the base plate lack the simplicity and/or ruggedness needed for an economical automatic system.

The ideal location for processing used oil filters is at the service facility that removes the filter from the vehicle, in particular if the filter can be processed while it is still warm. Service facilities normally deal with more than one size of filter. This multiple size processing requirement coupled with the numerous small business locations require an economical rugged system with adaptive size processing capability.

Automatic operation is needed for uniformity of processing and for labor savings. Automatic operation also facilitates the processing of warm filters as they are removed from the vehicle, as minimal operator input is required to initiate the process.

U.S. Pat. No. 5,274,906 provides for shearing off the base plate and then crushing the canister and filter element normal to the filter axis. The mechanism as claimed in '906 is not suitable for adapting to automatic operation, particularly where it is desired for the processed filter components to have a minimum amount of residual oil or where it is desired to separate the base plate from the canister and filter element. '906 deposits the sheared connector plate and crushed canister assembly into a common receptacle where oil from subsequent cycles will drain onto previously processed filter components. It has been found that when severing filter connector plates, small pieces of the internal construction of filters are generated and it is believed that shearing plate 43 in '906 will generate shaving like pieces which will collect and fill shear plate receiving slot 58 requiring on going maintenance and thus limit the utility of apparatus described.

SUMMARY OF THE INVENTION

The invention provides a method for automatically processing multiple used oil filters used for internal combustion engines for disposal, in particular for disposal in which essentially all of the residual oil is removed making the crushed canister and internal element a non-hazardous material and making the connector base plate available for recycling as scrap steel.

Therefore, the present invention provides a method and apparatus for processing used oil filters for recycling where the connector plates are severed from the canister and where the canister and filter elements are crusher squeezing out waste oil. A processing or crushing zone with one stationary wall and one opposite and parallel movable wall is provided on guide-ways and with both walls having one edge in a common plane.

Thus, the present invention provides an apparatus for automatically processing multiple used oil filters, for an engine using oil for lubrication, by shearing a connector plate of each filter from a canister and then crushing the canister which comprises: a fixed wall mounted on a frame; a movable wall mounted on the frame against which the used oil filter is positioned in a crushing zone and which movable wall is movable by a driving means in the crushing zone to crush the filer against the fixed wall, and which is retracted by the driving means from the crushing zone, wherein the walls have crushing surfaces which are at an acute angle to the horizontal and wherein a longitudinal axis of the filter is at the acute angle to horizontal on the movable wall; blade means mounted adjacent to the movable wall so as to shear the connector plate from the canister as the movable wall crushes the canister against the fixed wall; a feed chute mounted on the frame at another acute angle to horizontal with a first escapement means for individually and automatically feeding the oil filters to the crushing zone between the walls, wherein the retaining means holds a preceding oil filter of the multiple filters away from the crushing zone until the crushed canister and the sheared connector plate have been removed from the crushing zone of the apparatus; a second escapement means for retaining the oil filter in the crushing zone during the crushing and then allowing at least the crushed canister and connector plate to be removed from the crushing zone; and a tray device mounted on the frame adjacent to the crushing zone for removing and transferring at least the crushed canister from the apparatus.

The present invention further provides a process for automatically processing used oil filters of the type used in an engine which comprises: advancing the filters with a multiple filter feed chute mounted at an acute angle to horizontal on a frame of an apparatus with an escapement means for metering one filter at a time from the chute into a crushing zone with a fixed wall and a movable wall at the acute angle; introducing the one filters into the crushing zone on the movable wall one at a time using the escapement means, wherein a longitudinal axis of the filter is at another acute angle to horizontal; removing a filter connector base plate from a canister of the filter in the crushing zone by a guillotine like shearing action of a blade means which enters the crushing zone during the removing and also compressing the canister of the filter to a crushing pressure between the walls, thereby extracting residual oil from the canister and filter element, wherein the removing and compressing is with the movable wall which moves towards the fixed wall in the crushing zone so that the blade means shears the connector base plate from the filter and so that the walls crush the canister in the crushing zone; and discharging the connector plate, crushed canister and filter element from the apparatus onto: a tray device mounted on the frame for removing and transferring the crushed canister and optionally the severed connector plate out of the apparatus.

Further still, the present invention provides an apparatus for automatically processing used oil filters of the type used in an engine comprising: a multiple filter feed chute mounted on a frame such that a longitudinal axis of canister is at an acute angle to horizontal, with an escapement for metering one filter at a time from the chute into a crushing zone provided with a blade means, which blade means enters the crushing zone during the compressing of the canister and removes a connector plate from a canister of the filter by a guillotine like shearing action of the blade means, wherein a first wall is moved towards a second wall, each wall provided with a surface which is at another acute angle to horizontal in the crushing zone so that the blade means shears the connector base plate from the filter and the walls crush the canister in the crushing zone, thereby extracting residual oil from the filter element and discharging the crushed canister, filter element and the connector plate from the crushing zone.

Further still, the present invention provides an apparatus for processing oil filters for an engine using oil for lubrication by shearing a connector plate from a canister with a blade means which shears the connector plate and wherein the canister is crushed between a movable wall driven by a driving means and a fixed wall, the improvement which comprises an oil pump actuated by the driving means to remove the oil from a container for delivery to a storage tank, the improvement which comprises the blade means fixed to the driving means and a spring-loaded collapsible wall which engages the canister while the blade means cuts the connector plate and then the movable wall crushes the canister.

Significant features of the present invention are: (1) a retractable floor is preferably provided under the crushing zone having a horizontal surface in a first position, a retracted sloping surface in a second position and third position that is away from under the crushing zone and with said positions being in sequence with movements and positions of said movable wall. The retractable floor in the second position preferably forms a sloping surface to direct sheared off filter connector plates to a first selected location and the retractable floor in the third position is away from under said processing zone allowing processed filter canister assemblies to fall to an inclined surface directing them to a second select location.

(2) An escapement is provided for escaping one filter at a time into said processing zone. A Filter loading chute for feeding filters to be processed to said escapement.

(3) A driving mechanism is provided for driving the movable wall towards and away from said stationary wall, preferably having a spring-loaded attachment to the movable wall and having the spring-loaded attachment collapsing to solid upon the moving wall meeting predetermined resistance as the driving mechanism advances towards the stationary wall.

(4) A shearing blade is preferably attached to the driving mechanism and positioned so the shearing plane is normal and adjacent to the walls common edge and with a shearing edge leading relative to advance motion of the driving mechanism, positioned so that the shearing edge is masked by the spring-loaded movable wall when the movable wall is not meeting resistance but is extended as driving mechanism advances and movable wall meets resistance and because of the filter where upon the movable wall spring-loading collapses, shearing edge extends into and through the processing zone creating a shearing action as said blade passes said common edge of the stationary wall. A discharge means is provided for discharging processed filter components.

(5) A waste oil sump is provided for the recovered oil.

(6) The process is preferably controlled by a master control system and the process cycle is automatic.

(7) The filter axis in the processing zone is preferably vertical with the base plate down.

(8) Preferably, a pump to pump collected waste oil to a remote location is provided on the apparatus where the pump is preferably a piston type and action is slaved off said driving mechanism motion.

(9) Preferably the discharge means have paths for receiving severed base plates from a first select location and crushed filter canisters from a second select location cradles with draining provisions for holding them until a significant point in the subsequent process cycle before discharging them through diverting channels directing sheared off filter base plates to one external collection point and processed filter canisters to a second external collection point.

(10) The movable wall and the stationary wall are preferably essentially parallel to each other but one or both having a shallow concave shape in the surface running parallel to and centered with the axis of a filter in the processing zone.

(11) The driving mechanism preferably uses a hydraulic cylinder for the driving force and the shearing blade has a shearing edge which is a recessed V-shape.

(12) Preferably, the feed chute is positioned on the centerline of the crushing zone.

(13) The used filters are preferably escaped one at a time and reoriented from the feed chute slope into a vertical position on a shutter like mechanism over the cushing zone.

(14) Preferably, a shutter mechanism is operated by the action of the movable wall driving means and timed to feed the used filter into the crushing zone after the preceding crushed canister and connector plate are removed from the zone.

OBJECTS

It is the object of this invention to provide a process and apparatus for automatically processing used oil filters where the filters are placed in a feed chute having capacity for several filters and from which filters are escaped one at a time and fed into a crushing zone where the filter is supported by a an openable floor, where the filter is first clamped by an advancing of a movable wall driven by a hydraulic cylinder means positioning and holding the filter against a parallel fixed wall and where the driving means contains a shearing blade positioned to shear off a filter connector plate as the driving means with a spring-loaded attachment to the movable wall continues to advance collapsing the spring-loaded attachment exposing the blade to the filter. The shearing action continues and when the spring loading has fully collapsed, and the movable wall is solidly driven by the driving means crushing the filter canister to a crushing pressure against the stationary wall extracting the oil from the filter element and canister and where the used oil is collected in a container mounted to the apparatus.

An another objective of the invention is directing the severed connector plate in one direction away from oil draining and directing the crushed filter canister in another direction to facilitate segregation of the connector plate as scrap steel.

Another objective of the invention is an openable floor in the crushing zone to first open forming an incline plane to direct the discharged severed connector plates in one direction and on further opening having means for crushed canisters to go in another direction.

A further objective of the invention is to hold the squeeze force on the filter canister assembly for a finite period of time to facilitate more complete draining.

Still another objective of the invention is a discharge action at the start of a subsequent cycle that discharges the previously crushed filter canister and connector plate from the apparatus to separate positions for select disposal/recycle of each with the discharge action completed in a sufficiently short time so as not to drain oil from the dumping apparatus into receiving containers.

It is yet another objective of the invention to provide a pumping means for pumping the used oil from the apparatus collection container to a remote used oil storage.

These and other objects of the present invention will become increasingly apparent with reference to the following drawings and preferred embodiments.

DESCRIPTION OF THE DRAWINGS

FIG. 1 is a side view of the main apparatus components of this invention showing the primary structure and moving mechanisms, including a filter feed chute, filter escapement for feeding one filter at a time into a crushing zone, a movable wall driven by a hydraulic cylinder driving means, a fixed wall, an openable floor for supporting filter in the crushing zone, a piston type pump for pumping collected used oil, an enlarged view of the shearing blade with recessed V-shaped shearing edges and a partial view of the apparatus supporting structure.

FIG. 1A is a side view of a blade for shearing the oil filters.

FIG. 1B is a plan view of the blade shown in FIG. 1A.

FIG. 10 illustrates a modification to the slide bar for actuating the escapement providing spring over travel if the escapement was not free to travel its full stroke because of a fault.

FIG. 11 illustrates an improvement to the escapement means with a door incorporated on the shuttle that opens when the escapement means is adjacent to the crushing zone.

FIG. 13A shows a means for centering filters in the crushing zone but prior to crushing and shearing of the connector plate comprising; fingers moving in equal distance from each side coming against a filter centering it.

FIG. 13B illustrates filter centering, fingers retracted so as not to interfere with escaping a filter into the crushing zone.

FIG. 13C illustrates filter centering fingers fully retracted so as not to interfere with the movable wall in the advance position.

FIG. 17A is a left end view of FIG. 17 showing the crushing zone exit door in the closed position in solid lines and in the open position in phantom lines. Also shown is the exit door actuating mechanism attached to and driven by the hydraulic cylinder driving means. Additionally shown is a shearing blade fixed to the driving means with the V-shaped cutting edges for progressive shearing filter connector plates, positioned so as to effect centering of the filter in the crushing zone as the connector plate is severed.

FIG. 19 is a side view showing a first alternate apparatus with mechanism for final severing of the connector plate and the discharging of it into a first separate container. FIG. 19 also shows an interim step in the discharge tray return sequence that obviates its interference with severing of a connector plate.

FIG. 20 is a side view showing a further interim step of the first alternate apparatus mechanism for the discharge trays return sequence.

FIG. 21 is a side view showing yet a further return sequence step for the first alternate apparatus mechanism for the discharge tray driving mechanism that occurs after the trays have returned.

DETAILED DESCRIPTION OF THE INVENTION

Figure 2:
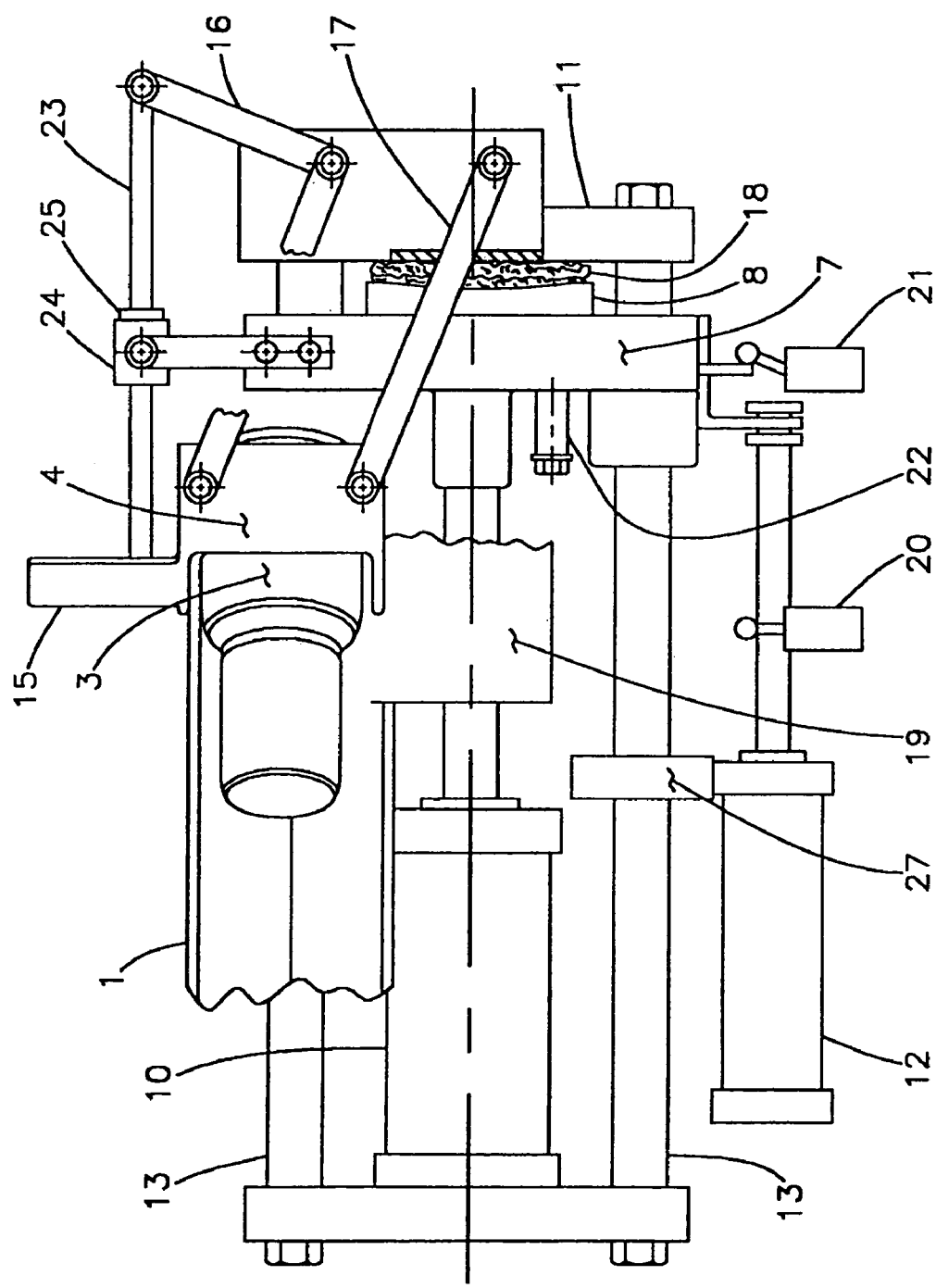
FIG. 2 is a top view including the hydraulic cylinder driving means in the advanced position, spring-loaded movable wall with a concave surface in contact with a crushed filter canister, the escapement shuttle in position to receive a filter from the feed chute, the escapement shuttle actuating mechanism, the used oil pump cylinder and hydraulic cylinder driving means position indicating switches.

All patents, patent applications, government publications, government regulations, and literature references cited in this specification are hereby incorporated herein by reference in their entirety. In case of conflict, the present description, including definitions, will control.

Reference is made to FIG. 1 illustrating hydraulic cylinder 10 mounted to a frame comprising guideways 13 and fixed wall 11 with the frame attached to floor support 47 through brackets 27. Hydraulic cylinder 10 powers driving means 7 mounted on guideways 13 and movable wall 8 is mounted to the driving means through a spring-loaded coupling.

In FIG. 1, driving means 7 mounted on guideways 13 is returned and driving means spring-loaded attachment to movable wall 8 is fully extended. In FIG. 1 but more easily seen in FIG. 3, escapement shuttle 4 is adjacent to and in alignment with a crushing zone, formed by a fixed wall 11, the opposite facing spring-loaded wall 8 and central to the two guide ways 13. Retractable openable floor 6 forms the bottom of the crushing zone and supports filter 3 in position 3A in the crushing zone with the filter axis parallel to the fixed wall.

The operating cycle starts with escaping a filter into the crushing zone which begins, as seen in FIG. 2, with movable wall 8 driven to its advanced position by the driving means 7, during the previous cycle, with bearing 24 having traveled along slide bar 23 contacting collar 25 fixed to bar 23 driving bar 23 attached to lever 16. Lever 16 and parallel levers 17 are rotated to where shuttle cradle 4 carried by parallel levers 17 is adjacent with feed chute 1 and where filter 3 moved by gravity has enter escapement shuttle 4. Filter 3 was previously restricted from sliding down feed chute 1 by shield 15 attached to shuttle 4 when shuttle 4 was out of position to receive filter 3. After a driving means 7 advanced dwell period, during which time, additional used oil can drain from crushed filter canister 18, hydraulic cylinder 10 retracts driving means 7.

Figure 5:
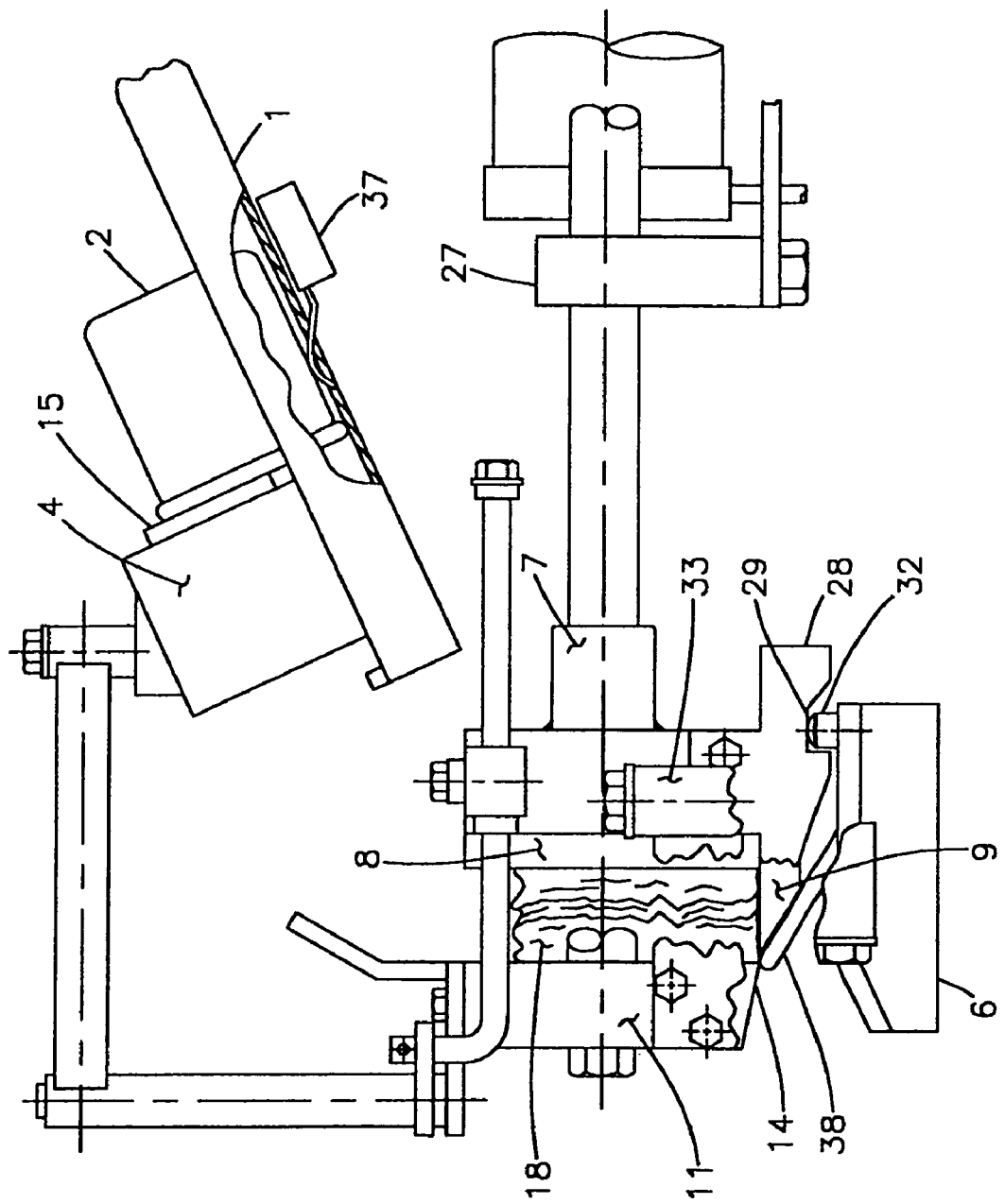
FIG. 5 is similar to FIG. 4 but showing the hydraulic cylinder driving means nearing the full advance position and showing the filter connector plate nearly sheared off with the retractable floor positioned so as not to interfere with the shearing of the filter connector plate.
Figure 7:
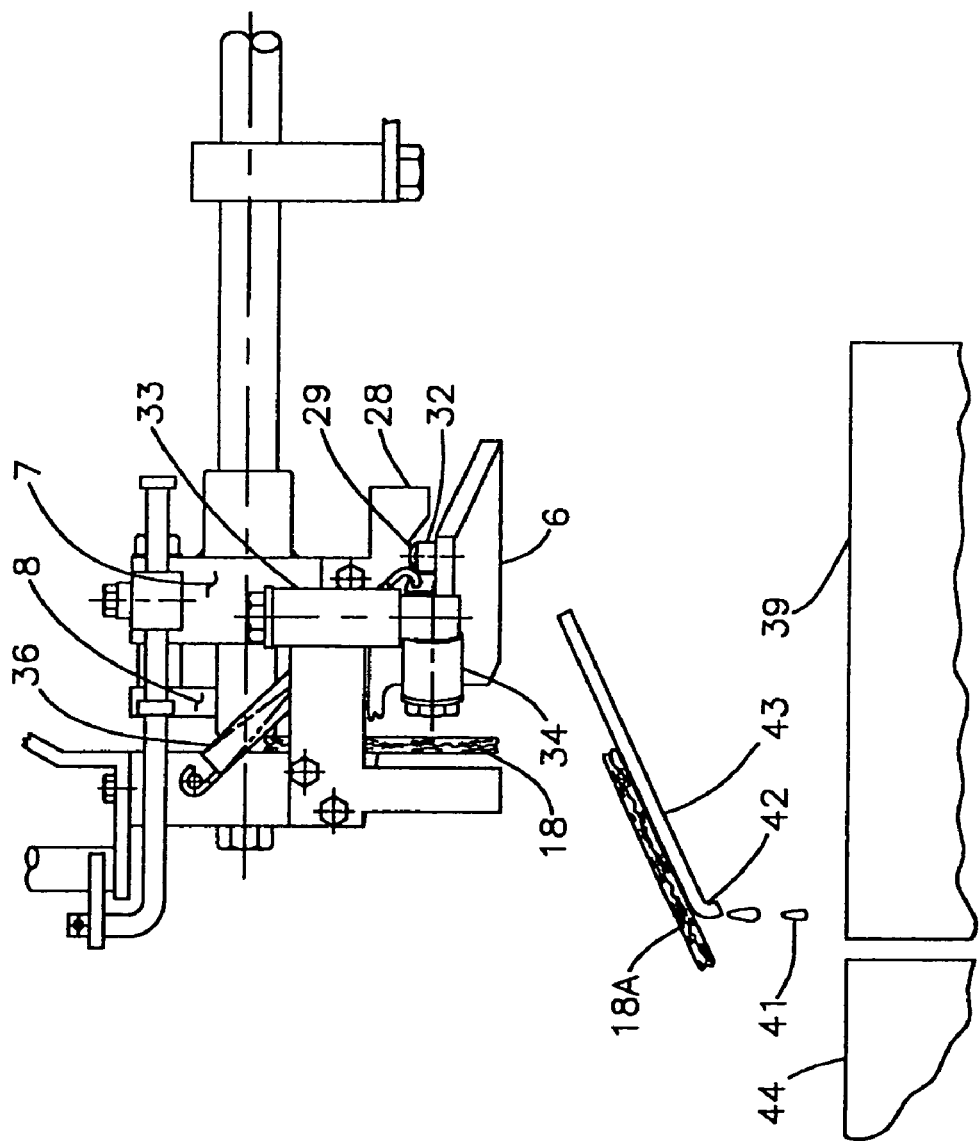
FIG. 7 is a view similar to FIG. 5 except the driving means is partially returned, the filter support floor is opened swung on a vertical axis providing clearance for a crushed filter canister to drop free onto a fixed sloping surface directing it in another direction.

In FIG. 5 it can be seen that as driving means 7 retracts, cam 28 attached to driving means 7, with notch 29, engages pin 32 on floor 6. As driving means 7 continues to retract, cam notch 29 bears on retractable floor pin 32 causing openable floor 6 to rotate about vertical pivot mounting 33 as can be seen in FIG. 7. This rotating action of openable floor 6 swings it on an arc creating an opening under the crushing zone and crushed filter canister 18. During this same increment of driving means 7 retracting, spring-loaded movable wall 8 extends stripping crushed filter canister 18 off shear blade 9.

Further retraction of driving means 7 and with spring-loaded movable wall 8 fully extended, crushed canister 18 is released falling by gravity onto sloping surface 43. Draining used oil 41 follows the curved lip 42 of surface 43 directing the flow of used oil 41 downwards into collection container 39 while inertia of moving crushed canister 18A carries it in one direction to location 44 where it enters a discharge means (not shown) leading to an external location.

Figure 3:
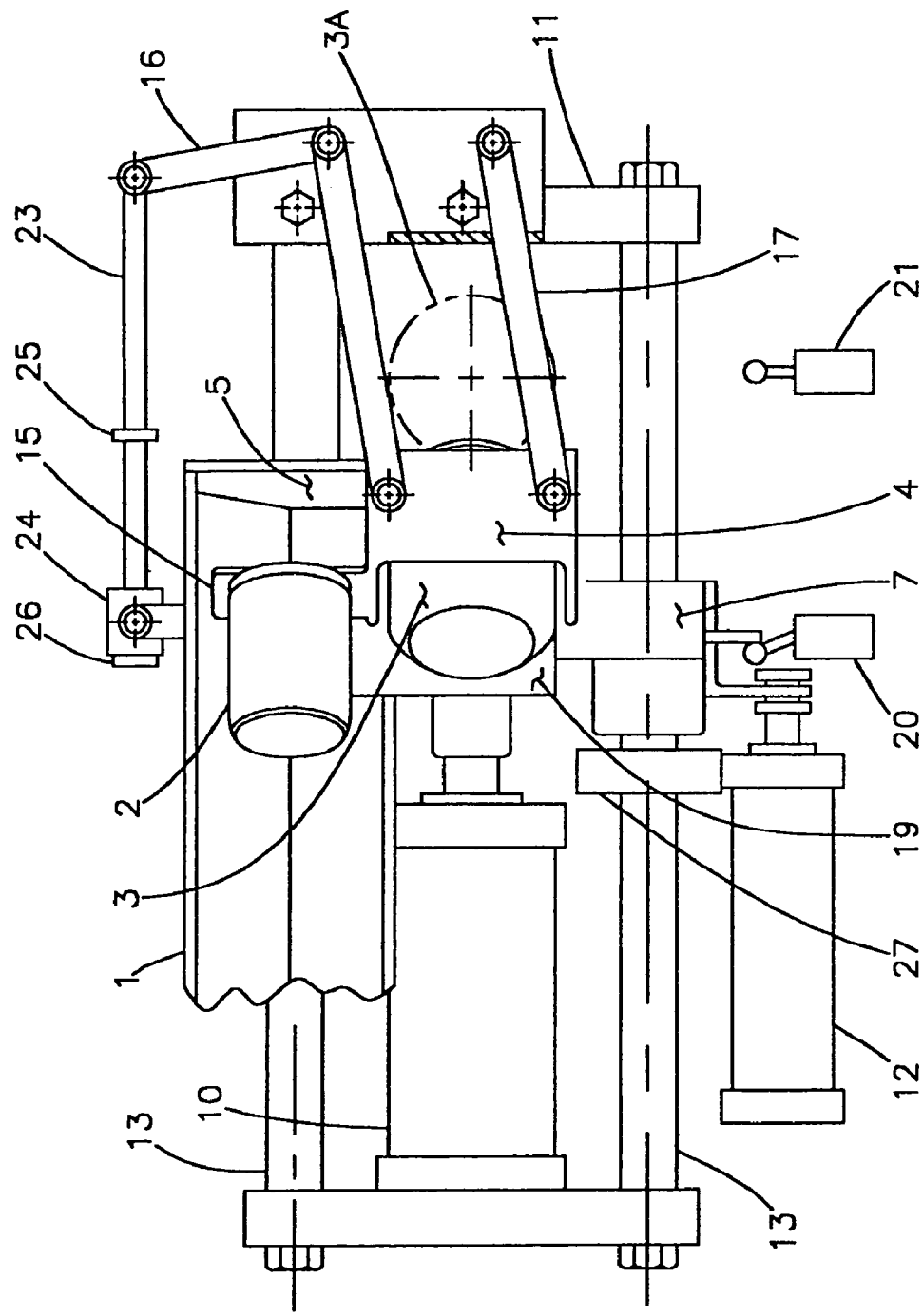
FIG. 3 is similar to FIG. 2 except it shows the hydraulic cylinder driving means retracted and the escapement shuttle in position to escape a filter into the crushing zone.
Figure 4:
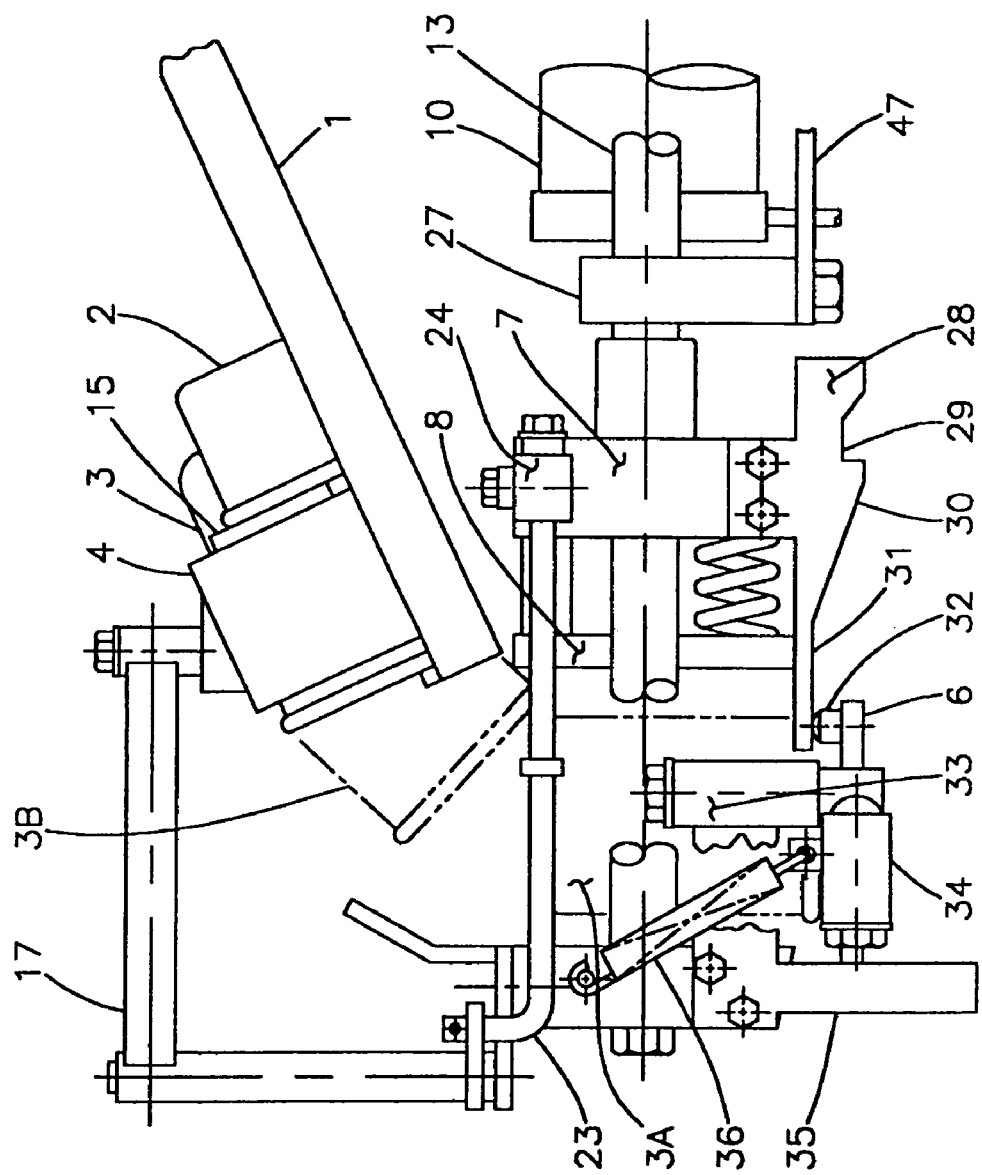
FIG. 4 is an side view of the side opposite FIG. 1 showing detail of the pivoting supporting mechanism for the retractable (openable) floor for supporting a filter in the crushing zone and showing the path of a filter being escaped into the crushing zone.

During the final increment of retraction of driving means 7, as seen in FIG. 3, sliding bearing 24 driven by ram 7 contacts collar 26 on slide bar 23 pulling bar 23 which in turn causes levers 16 and 17 to rotate counter-clockwise. Levers 17 move escapement shuttle 4 with filter 3 from a position adjacent to feed chute 1 to a position adjacent to the crushing zone. Filter 3 carried along by shuttle 4 is supported by sloping platform 19 during the later part of the transverse movement. Filter 3 is restricted from sliding axially along sloping surface 19 and out of shuttle 4 by feed chute end stop plate 5, which is at the end of and normal to feed chute 1, until essentially the completion of the shuttle transverse movement. End plate 5 extends towards the crushing zone (center of the machine) but ends so as to allow filter 3 in shuttle 4, when adjacent to the crushing zone, to slide off sloping surface 19 into the crushing zone as depicted by filter 3B (FIG. 4). Filters in feed chute 1 are kept from advancing in feed chute 1 when shuttle 4 is not in alignment with feed chute 1 by shield plate 15 attached to shuttle 4. With filter 3 escaped into position 3A in the crushing zone, driving means 7 advances driven by hydraulic cylinder 10 bringing movable wall 8 into firm contact with filter in position 3A. Driving means 7 also advances shearing blade 9, with a recessed V-shaped cutting edge as illustrated in FIG. 1B, into engagement with filter in position 3A at essentially the top surface of filter 3A connector plate.

Figure 6:
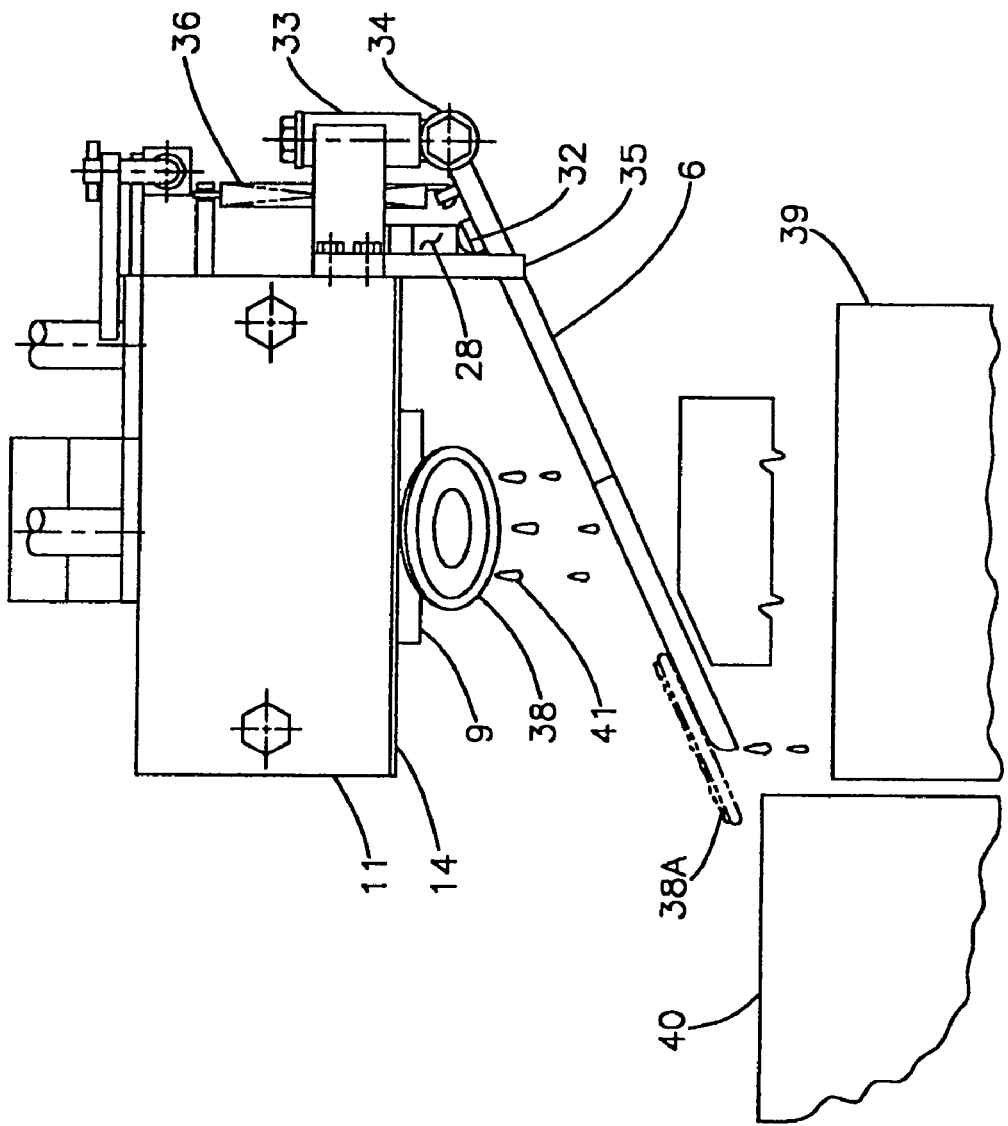
FIG. 6 is a left end projection view of FIG. 5 showing the filter support floor in the retracted downward sloping first position, used oil draining from the crushed canister and the final shearing of the connector plate and it being directed in one direction.

As shearing blade 9 engages filter 3A, spring-loaded movable wall 8 securely holds filter 3A against fixed wall 11. Further advancement of driving means 7 causes the collapse of spring-loaded attachment to movable wall 8, crushing canister 18 and severing connector plate 38 by shearing action between blade 9 and fixed wall edge 14. During this period of driving means 7 advance, cam bar 28, attached to driving means 7, as seen in FIG. 4 and FIG. 5, ramp 30 has engaged pin 32 attached to filter support floor 6. Spring 36 holds pin 32 on floor 6 in contact with cam 28. Pin 32 is camed downwards, by ramp 30, causing floor 6, as seen in FIG. 5 and FIG. 6, to rotate about horizontal pivot mounting 34 to a downward sloping angle as seen in FIG. 6.

The sloping attitude of floor 6 has two functions; first is to provide clearance for severing of filter connector plate 38 which is forced downwards as it is sheared by blade 9; the second function is to form an incline plane for severed connector plate 38A to slide on in another direction to location 40. The end of floor 6 has a curved edge, as seen in FIG. 6, which directs draining used oil 41 downwards. Inertia carries severed connector plate 38A to location 40 where it enters a discharge means (not shown) leading to an external location.

Driving means 7 completes its advance motion crushing filter canister 18 squeezing used oil from canister 18. It has been found when crushing filter canisters normal to their axis to extract used oil, flat wall surfaces apply more pressure to the central axis portion of the canister than to areas farthest from the filter axis. A shallow concave surface in one or both of the wall surfaces, in contact with the canister while crushing, more evenly distributes the pressure on the canister for more complete used oil extraction. This concave wall surface is illustrated in FIG. 2.

As driving means 7 completes its advance stroke, bearing 24 moved by driving means 7 motion contacts collar 25 fixed on slide bar 23 connected to lever 16 causing clockwise rotation of lever 16 and parallel levers 17 positioning shuttle 4 adjacent to feed chute 1 moving shield 15 away from contact with filters manually placed in feed chute 1. Filters, in feed chute 1, are now free to slide one filter increment down feed chute 1 placing the lead filter in shuttle 4. The foregoing description of operation covers one complete cycle which will repeat automatically providing at the appropriate point of the automatic cycle, a filter to be processed is sensed in feed chute 1 by the logic controller in FIG. 9 through filter sensing switch 37 in FIG. 5.

Figure 9:
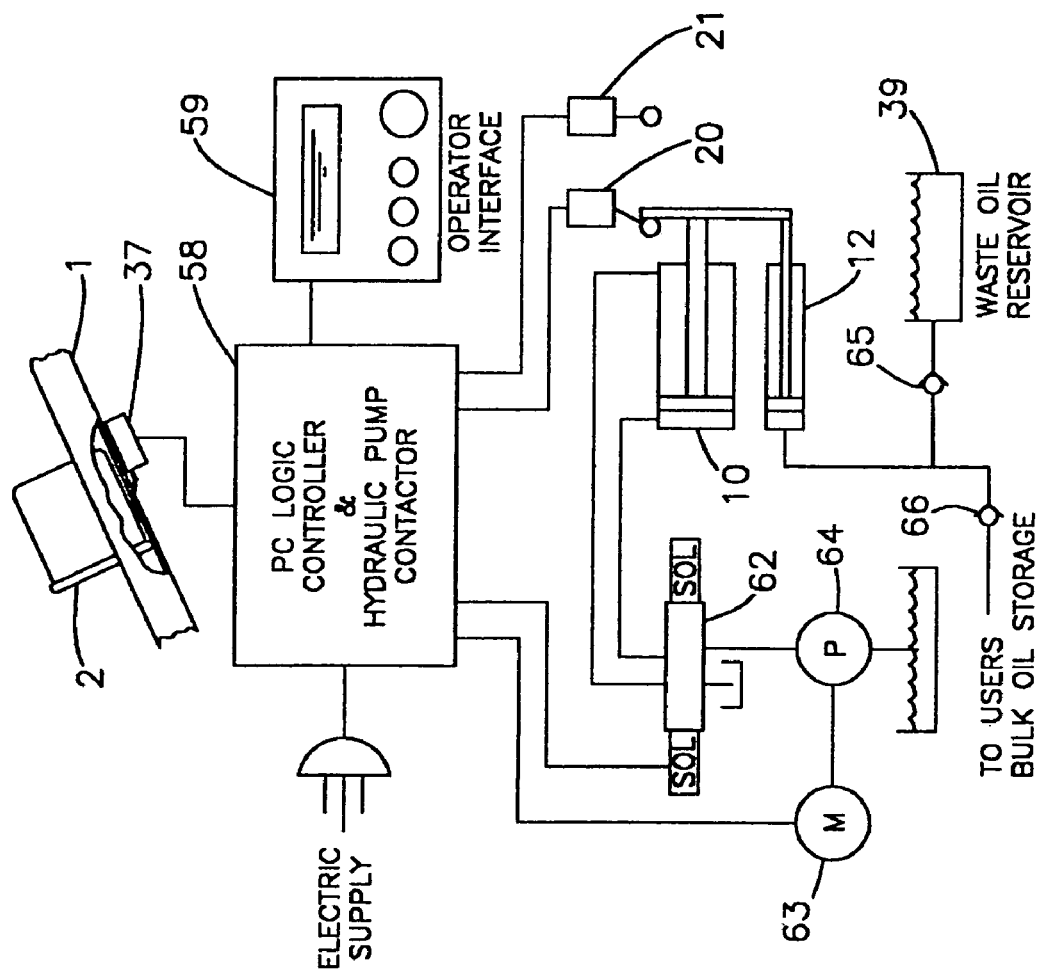
FIG. 9 is a schematic of the control functions which provide for automatic operation of the process.

FIG. 9 schematic illustrates the relationship between the various control components and the operation of the used oil pump. The process automatic cycle is monitored and controlled by a programmable logic controller depicted in schematic block 58. Electrical power is fed by a power cord to an electrical magnetic contactor, also depicted in block 58, which is energized by manual input through operator interface 59. The contactor in turn energizes the logic controller and the hydraulic pump drive motor 63. Hydraulic pump 64 supplies hydraulic pressure to the solenoid operated 4-way directional valve 62. The logic controller receives input signals at significant positions in the process cycle from drive means hydraulic cylinder 10 position indicating switches 20 and 21. When an automatic cycle is initiated through the operator interface, the logic controller in the appropriate sequence energizes one of directional valves 62 solenoids directing hydraulic pressure to the blind end of drive means hydraulic cylinder 10 causing it to advance releasing "cylinder returned" sensing switch 20. As drive means 7 completes its forward stroke, the "cylinder advanced" sensing switch 21 is actuated. After a squeeze dwell period, the logic controller energizes the opposite solenoid on the directional valve 62 which in turn ports hydraulic pressure to the rod end of the drive means cylinder 10 causing it to retract. When hydraulic cylinder 10 drive means advances, it also extends the used oil pump cylinder 12 piston rod connected through a mechanical coupling. The used oil pump cylinder 12 draws oil from the used oil container 39 through check valve 65. As cylinder 10 returns, retracting pump cylinder 12 piston rod, used oil is pumped out through second check valve 66 to a remote used oil storage tank.

Exception to the automatic cycle described above occurs if there is not a filter in feed chute 1 at the moment the logic controller monitors filter present switch 37. If a filter is not present, the automatic cycle is interrupted until a filter is placed in feed chute 1 and is sensed by switch 37.

Figure 8:
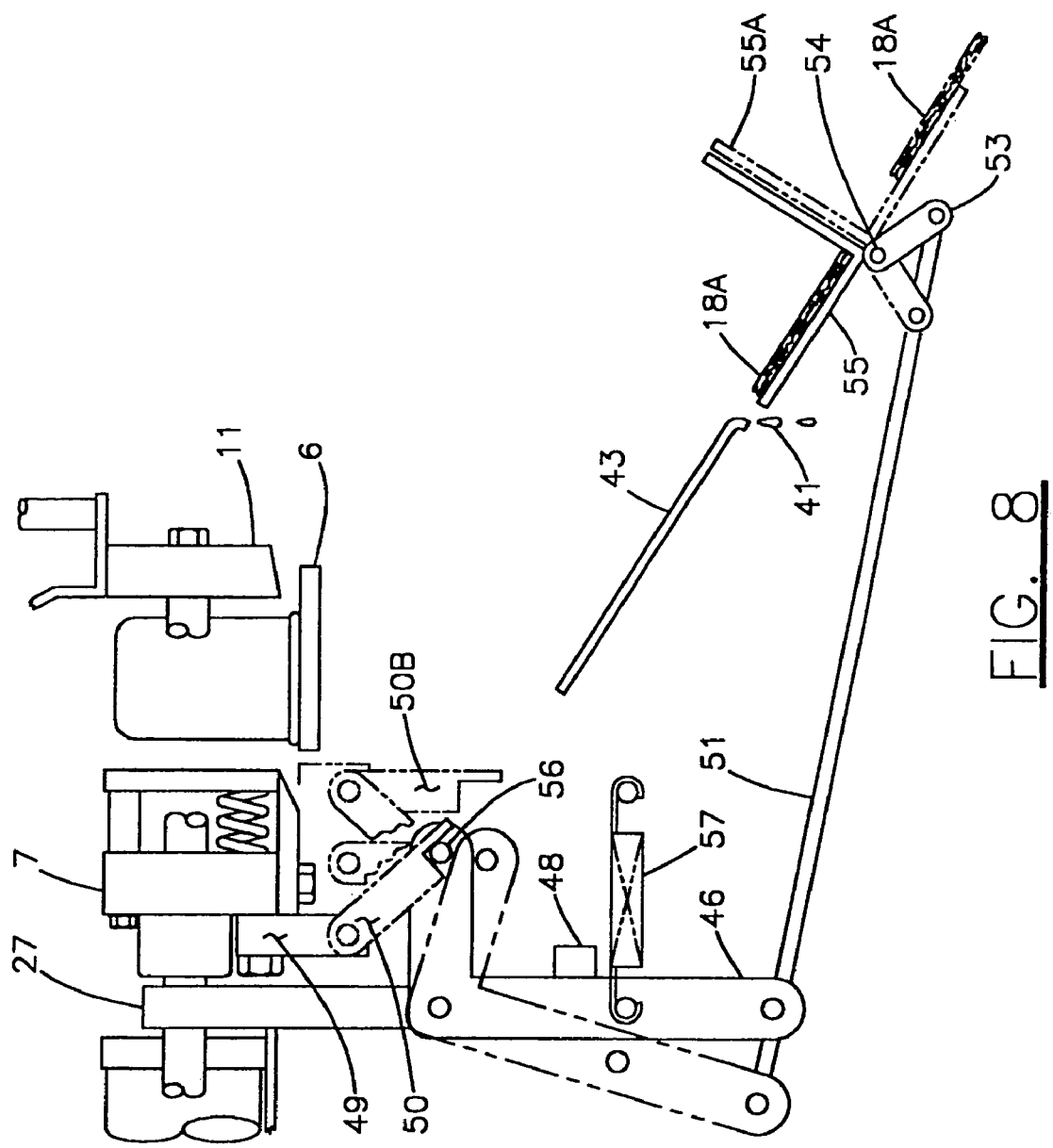
FIG. 8 shows a mechanism for receiving a crushed filter canister from the sloping surface shown in FIG. 7 and retaining it until the start of a subsequent cycle where it is discharged by the initial advance movement of the driving means via linkage.

An option, to the above process and apparatus, is illustrated in FIG. 8 for receiving crushed filter canister 18A from location 43 and holding crushed canister 18A before it is discharged from the apparatus until the start of advance motion of driving means 7 in the subsequent cycle. This provides a holding time for residual used oil on crushed canister 18A to drain off. Discharge cradle 55 has provisions, not illustrated, for draining. As driving means 7 starts advancing, pawl 50, attached to driving means 7 through pawl 50 pivot point on bracket 49, engages pin 56 on bell crank 46 rotating bell crank clockwise. Bell crank 46 pulls on link 51 through a pivoting connection. Link 51 pulling on arm 53 attached to cradle 55 pivot shaft 54 rotates cradle 55 essentially 90 degrees, to attitude illustrated by the cradle 55 in position 55A, where crushed canister 18A is discharged by gravity. Immediately after cradle 55 reaches its full clockwise rotation position, it begins its return to its initial position as pawl 50 travels "over center" allowing tension spring 57 to return bell crank 46 back to stop 48. Cradle 55 discharge cycle is completed in the first portion of driving means 7 forward stroke. Pawl 50 hangs free (50B) during the remaining driving means 7 forward stroke. On driving means 7 return stroke, pawl 50 is reset as it rides up over pin 56. This optional function can be modified to also include severed filter connector plates received from sloping floor 6. Another feature of cradle 55 discharge cycle is the relative short time period the cradle is in the discharge position to where it could drip used oil in an unwanted place.

In practice, because of used oil viscosity, no oil drains off during the short period the cradle is in position 55A. The above optional discharge cradle 55 cycle can be arranged with two diverting channels so as to discharge a crushed filter canister in one position and a severed connector plate to another position.

Figure 12:
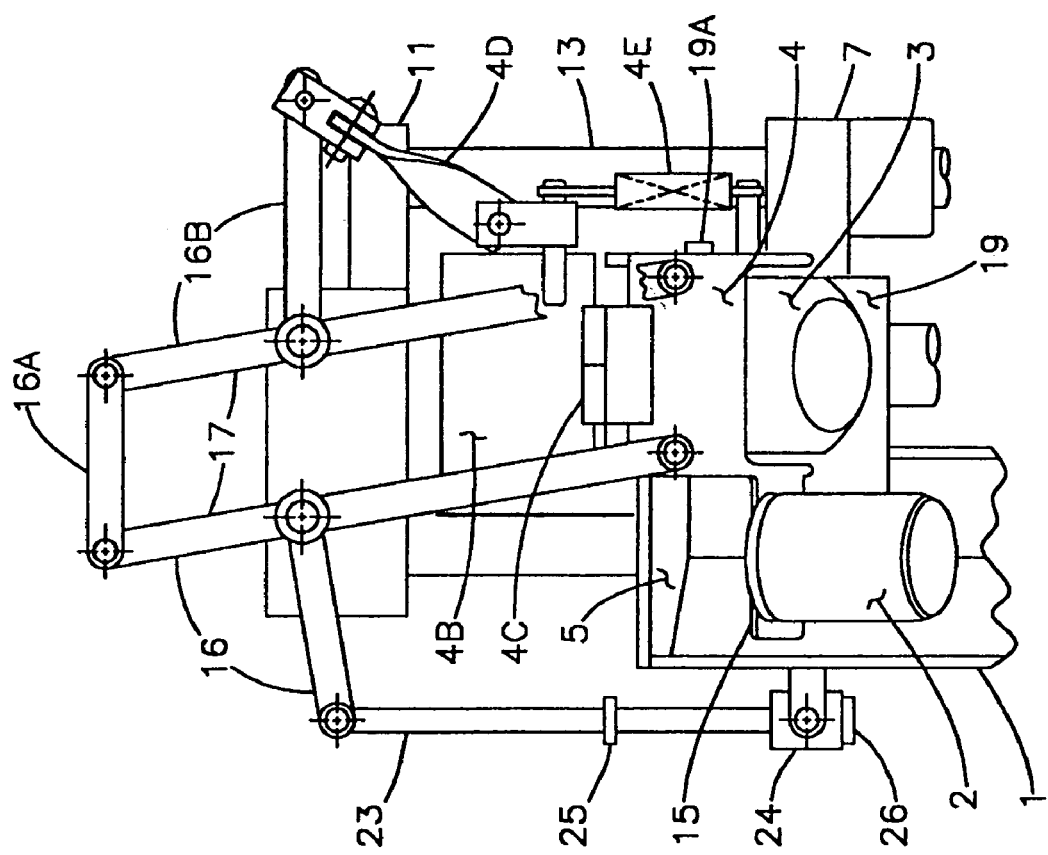
FIG. 12 is a top view illustrating the actuating means for escapement means improvement of FIG. 11.

Another option to the above process and apparatus is adding door 4A to shuttle 4, illustrated in FIG. 11, to assist in directing filter 3B into the crushing zone. With this added feature, linkage actuating the shuttle transverse motion is modified, as illustrated in FIG. 12, to open shuttle door 4A subsequent to shuttle 4 completing its traverse motion to a position adjacent to the crushing zone. Shuttle 4 traverse motion is interrupted by it coming in contact with stop 19A at which point driving means 7 still has a short distance to travel on its return stroke. As driving means 7 completes its return stroke, bar 23 pulls on bell crank 16 arm rotating bell crank 16 counter-clockwise. Bell crank 16 is on the same axis as one parallel lever 17 but is not rotationally connected. Bell crank 16 drives link 16A transferring motion to bell crank 16B which is on the same axis as another parallel lever 17 but has no angular drive connection to it. Traverse motion of shuttle 4, for this option, is driven through link 4D connecting bell crank 16B arm with shuttle door 4B attached by hinge 4C which is held closed by spring 4E. The increment of return motion of driving means 7, after shuttle 4 has come to rest against stop 19A, continues the transfer of motion to link 4D which pulls on door 4A, overcoming spring 4E opening Door 4D to position 4B. This is illustrated in FIG. 11.

Opening shuttle door to position 4B releases filter 3 and deflects filter 3B into an axis vertical attitude as it is driven by gravity into the crushing zone. On driving means 7 forward stroke, the above apparatus motions are reversed returning shuttle 4 to its position adjacent to feed chute 1.

Still another option to the above apparatus is spring overtravel protection added to shuttle 4 transverse drive slide bar 23, illustrated in FIG. 10. The normal forward motion of driving means 7 is limited by the thickness of a crushed canister in the crushing zone as driving means 7 stalls against the crushed canister. In event there is not a filter in the crushing zone, driving means 7 overtravels driving the escapement linkage of FIG. 2 and FIG. 3 into an overtravel position which could cause damage. Also, if escapement motions were restricted by a misaligned filter or some other malfunction, linkage driving escapement motions could be damaged. To prevent such damage, escapement drive link slide bar 23 can be modified as illustrated in FIG. 10.

In normal operation, as driving means 7 advances, bearing 24 slides free on shouldered sleeve 24A until bearing 24 contacts collar 25 fixed to bar 23. Further motion of bearing 24 drives bar 23 actuating the escapement means but if shuttle 4 is restricted from moving a normal amount, for example, spring 23C will compress allowing bar 23 to continue to travel sliding through bushing 23D avoiding damage.

On driving means 7 return stroke, if there is a restriction to an escapement motion, bearing 24 can continue to travel causing shouldered sleeve 24A to slide on bar 23 compressing spring 23B and preventing damage. springs 23B and 23C are preloaded providing normally required driving forces without there deflection.

A further option to the above process and apparatus is a means for centering filters in the crushing zone is illustrated in FIGS. 13A, 13B and 13C. A filter resting on floor 6 (refer to FIG. 1) in the crushing zone, is centered as driving means begins its forward stroke advancing movable wall 8. During the first increment of movable wall 8 advance stroke but before a filter in position 3A is griped by movable wall 8, centering fingers 67, under tension of spring 67B, are released by ramps on cam bars 68, as illustrated in FIG. 13A, to move towards each other, rotating around pivot pins 67C, as rollers 67A mounted on the lower side of center fingers 67 ride down the ramps on cam bar 68, centering filter 3A. As movable wall 8 continues to advances, centering finger rollers 67A are engaged by perpendicular cam bar ramps 68B which swing fingers 67 outwards to clear advancing movable wall 8. This is illustrated in FIG. 13C. When a filter to be processed is escaped into the crushing zone, centering fingers 67 are held retracted, so not to interfere with feeding of filters, by surface 68A of cam bars 68. This illustrated in FIG. 13B.

Figure 14A:
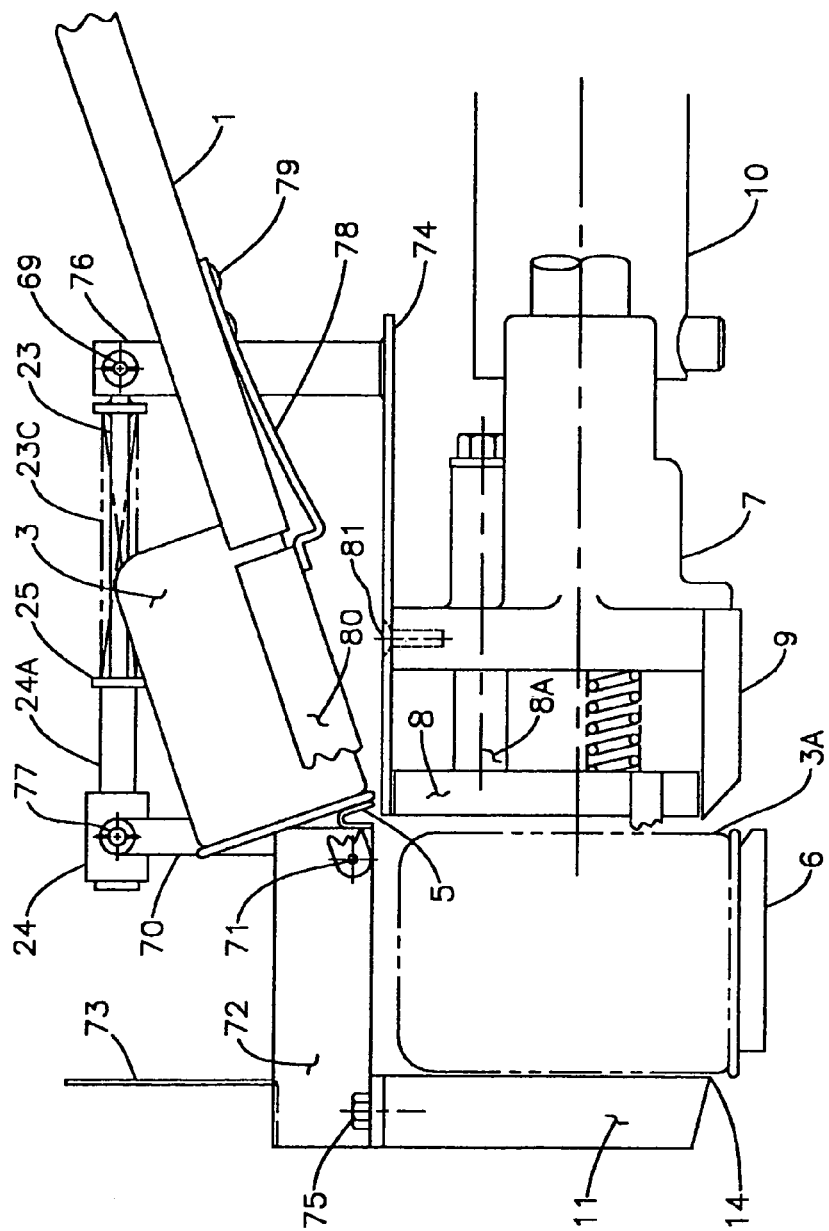
FIG. 14A illustrates an alternate filter escapement means comprising; a feed chute aligned centrally with the crushing zone and a cradle at the lower end of the feed chute adjacent to the crushing zone hinged so as to tip-up a filter on the cradle to an axis vertical position.
Figure 14B:
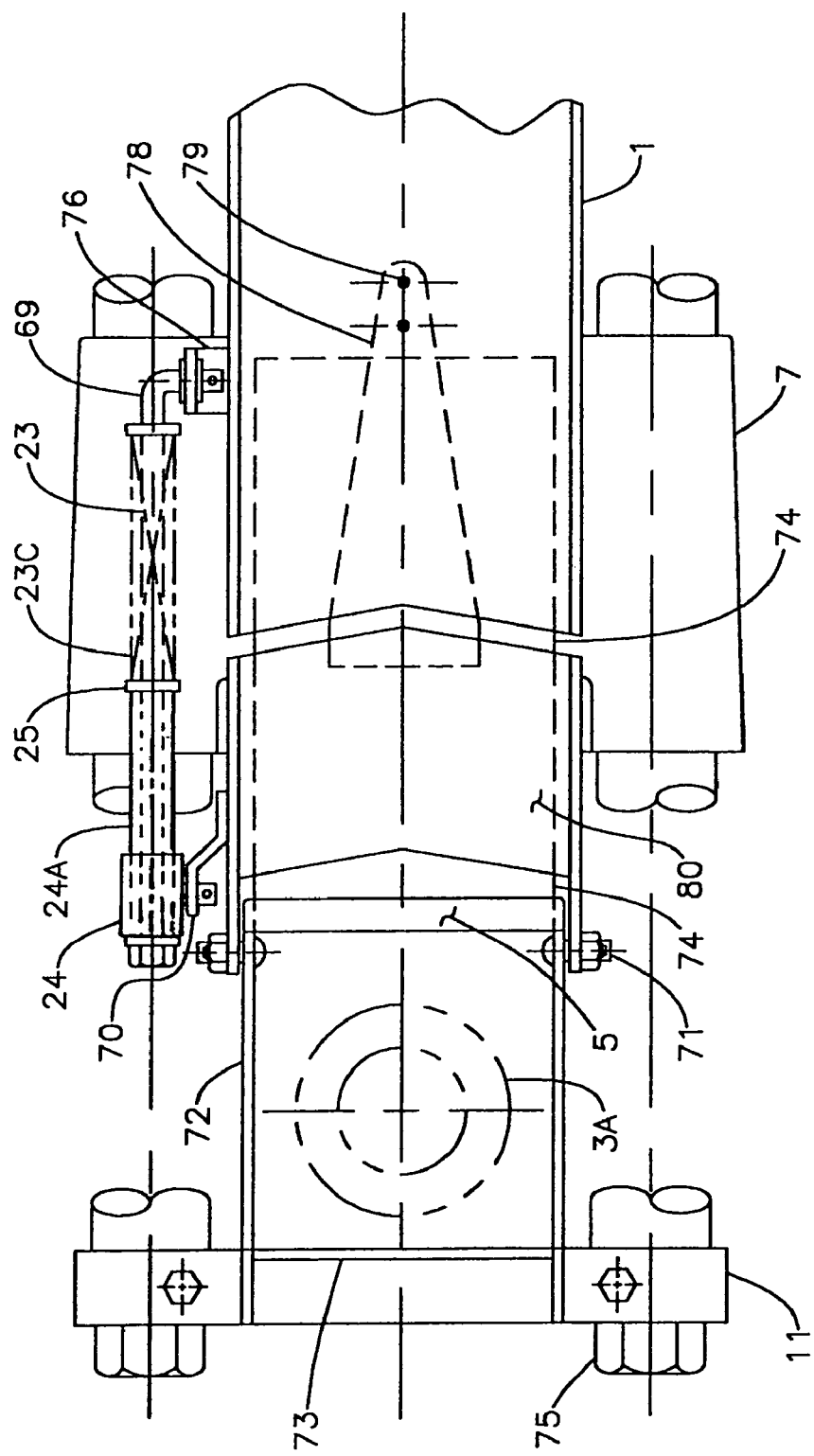
FIG. 14B the alternate escapement means illustrating the cradle in the vertical tipped-up position actuated by the advance motion of the driving means depositing the filter being fed on a horizontal plate above the crushing zone with the plate attached to the driving means so that the horizontal plate is pulled out from under the tipped-up filter, as the driving means retracts, releasing the filter into the crushing zone.
Figure 14C:
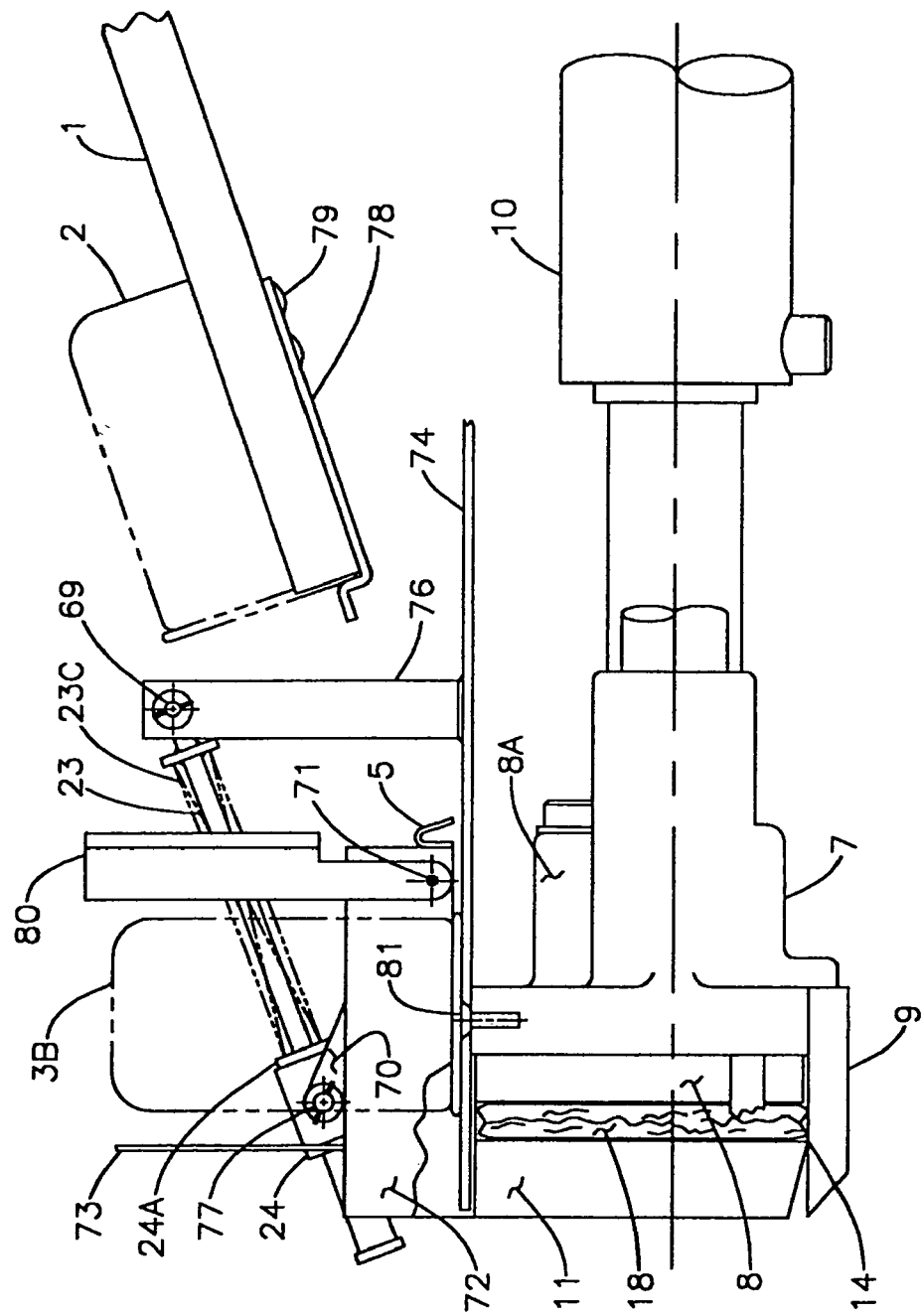
FIG. 14C is a top view of the alternate escapement means.

An alternate system for escaping filters one at a time into the crushing zone is illustrated in FIGS. 14A, 14B and 14C. Feed chute 1 is located centrally to the crushing zone an seen in FIG. 14B. In FIG. 14A, filter 3 is held by tip-up cradle 80 and is retained from sliding further by fixed end plate 5 that is supported by bracket 72 which is fastened to fixed wall 11 with bolts 75. FIG. 14A shows the filer escapement apparatus with driving means 7 fully retracted. When the tip-up cradle is in the retracted or load position as illustrated in FIG. 14A the cradle presses down on leaf spring excluder 78 that is fastened to feed chute 1 by rivets 79. In this position filters can slide down the feed chute into cradle 80 and the lead filter is stopped by end plate 5. Deck plate 74 is fastened to driving means 7 by fasteners 81 and extends toward the crushing zone flush with the face of movable wall 8. Deck plate 74 extends aft away from the crushing zone to providing a mounting for actuator arm 76.

When driving means 7 advances, deck plate 74 also moves along over the top of the crushing zone acting as a shutter like device. As movable wall 8 spring loading collapses crushing canister 18, deck plate 74 covers the crushing zone providing a support for the next filter. When driving means 7 advances, actuator arm 76 starts pushing bar 23 through free travel region 24A. This free travel region delays action of lever arm 70 until deck plate 74 has covered the crushing zone. After bar 23 passes free travel region 24A and has pushed through bearing 24, to where bar collar 25 engages bearing 24, lever arm 70 rotates cradle 80 around pivot point 71. Filter 3 in cradle 80 is raised clear of end plate 5 and when filter 3 is vertical the connector plate on filter 3 slips off of the top of end plate 5, dropping to and resting on deck plate 74 over the crushing zone as illustrated in FIG. 14C by filter 3 in position 3B. Filter 3B now sitting on deck plate 74 falls into the crushing zone when deck plate 74 is retracted along with driving means 7.

When deck plate 74 retracts, space opens between fixed wall 11, stationary stabilizer wall 73 and deck plate 74 and when deck plate 74 is even with movable wall 8, filter 3B, restrained from moving with deck plate 74 by the backside of end plate 5, drops into the crushing zone. FIG. 14C, illustrates, as cradle 80 lifts, leaf spring excluder 78 raises to stop next filter 2 in feed chute 1 from advancing until cradle 80 has returned to its load position, pushing excluder 78 clear of feed chute 1 pathway.

Figure 15:
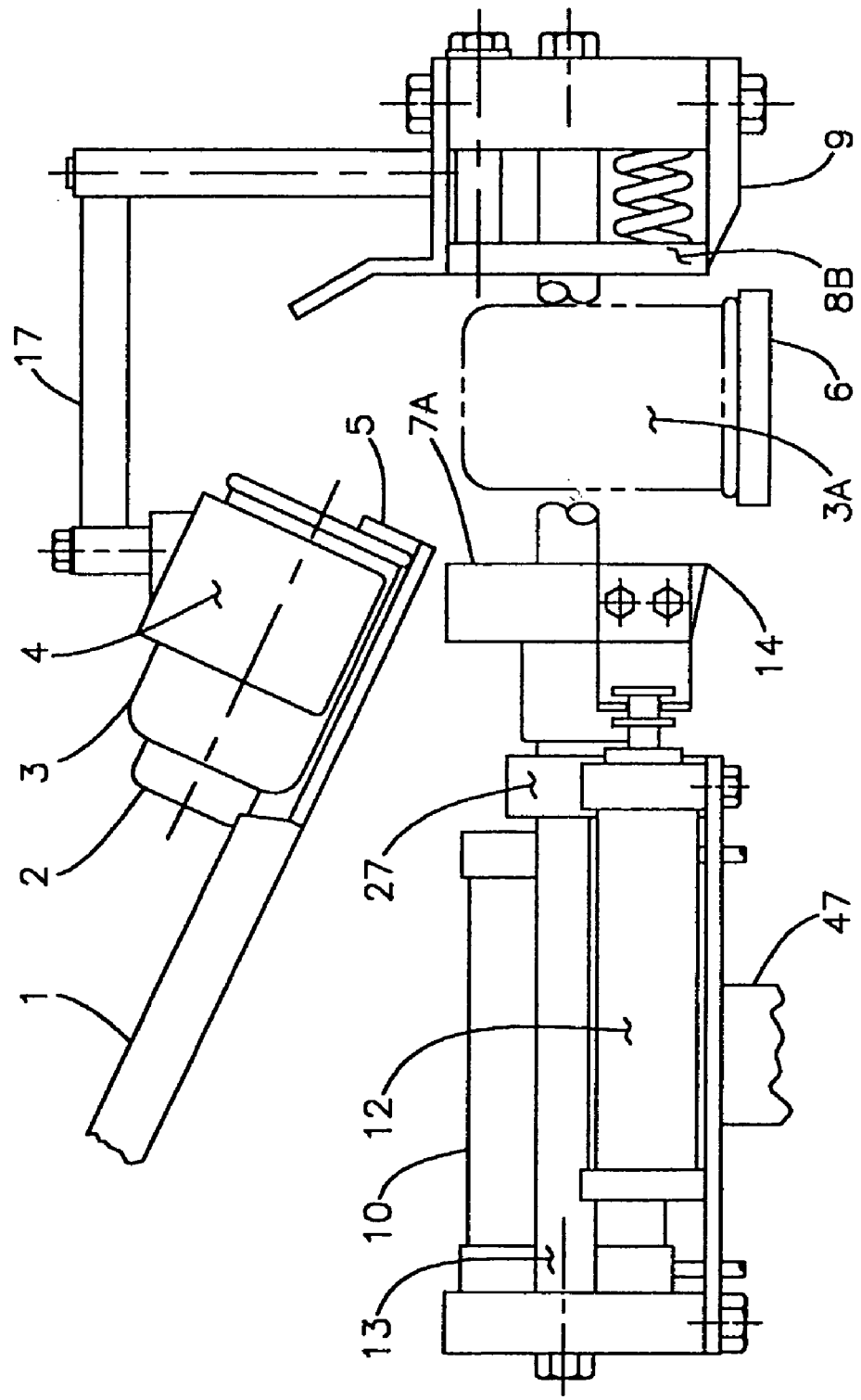
FIG. 15 is a side view of an alternate embodiment of this invention with a moving wall solidly connected to a hydraulic cylinder driving means and an opposite wall with a spring-loaded attachment to a fixed end frame element which has a shear blade attached.

An alternate embodiment of this invention is illustrated in FIG. 15 for automatically escaping a single used oil filter from a multiple filter feed chute into a crushing zone where the filter connector plate is sheared from the filter canister, where the canister and filter element are crushed extracting retained used oil and where the sheared connector plate and crushed canister are selectively discharged from the crushing zone. In automatic operation, filter 3 is escaped from feed chute 1 and during the final increment of retraction of movable wall 7A, filter 3 is driven, by gravity, into a crushing zone intermediate to movable wall 7A and spring-loaded wall 8B attached to fixed frame element 11A, resting on crushing zone floor 6.

With filter 3 in the crushing zone, hydraulic cylinder 10 driving means advances driving movable wall 7A towards filter 3A forcing it against spring-loaded wall 8B collapsing its spring loading exposing shear blade to filter 3A with the cutting blade essentially just above the canister connector plate severing the connector from the canister. On contact of the movable wall 7A with filter 3A, holding it solidly against spring loaded wall 8B, floor 6 retracts downwards driven by cam 28 as can be seen in FIGS. 4 and 5.

Continued advancement of wall 7A, completely collapses wall 8B spring loading, shears the connector plate from filter 3A canister and crushes the canister to a pressure extracting the used oil. Sheared connector plate 38, as illustrated in FIG. 6 falls away, sliding on now sloping floor 6 to location 40. After a dwell period in which movable wall 7A maintains a crushing pressure on the canister for more complete draining, driving means 10 retracts, completely opening floor 6, under the crushing zone by means of cam 28, notch 29 engaging pin 32 on floor 6 and rotating floor 6 on its vertical axis 33 as cam 28 mounted to movable wall retracts. As movable wall 7A continues retracting, wall 8B spring loading extends striping crushed canister 18 off blade 9.

Further retraction releases crushed canister 18 where it falls to sloping surface 43 then slides to location 44. The opening of floor 6 and the discharge of crushed canister 18 are as illustrated in FIG. 7. Other functions, not here described, of this alternate embodiment remain essentially as described in the primary embodiment above.

An improved but simplified, more reliable and less costly system and apparatus for recycling used oil filters is illustrated in FIGS. 16 through 22. The method and apparatus for severing the connector plate and crushing the filter canister are essentially as previously described. To simplify construction and eliminate a shuttling function for the escaping and feeding filters into the crushing zone and to increase the size range capability of filters being processed, the feed chute is positioned in alignment and adjacent to the crushing zone and both the feed chute and crushing zone are essentially at a common acute angle (slope) so as to use gravity to drive filters into the crushing zone and to drive crushed filter canisters out of the crushing zone. The path of travel of driving means and the movable wall are essentially normal to feed chute and the axis of a filter in the crushing zone.

Figure 16:
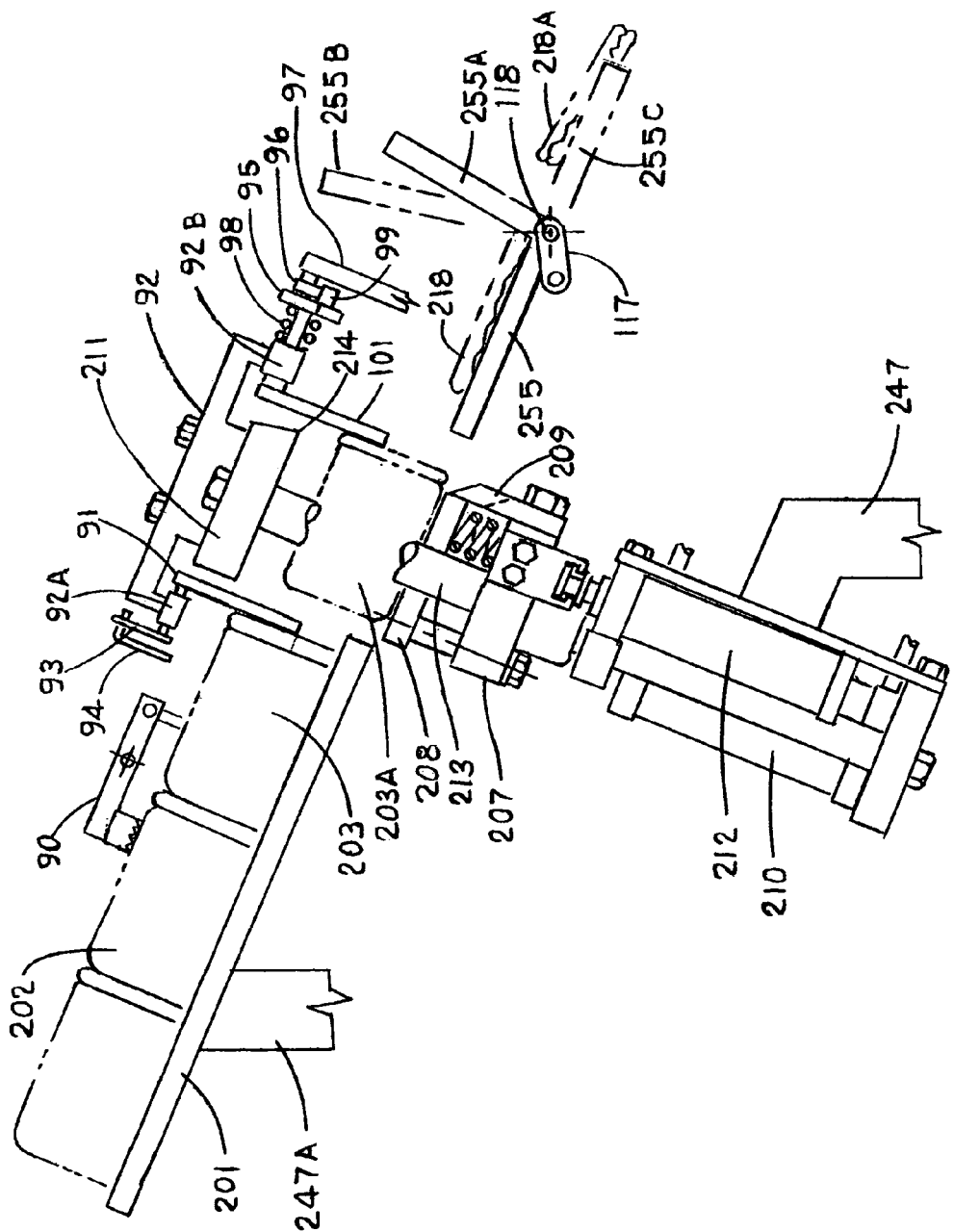
FIG. 16 is a side view of an improved apparatus showing the primary structure and apparatus, including a hydraulic cylinder driving means, a filter feed chute, filter escapement for feeding one filter at a time into a crushing zone, a movable wall driven by a hydraulic cylinder, a fixed wall, an operable door for escaping one filter at a time from the feed chute into the crushing zone, a gripping means for holding a second filter in the feed chute back while the door is open feeding a first positioned filter into the crushing zone, an operable exit door to the crushing zone when closed axially positioning a filter in the crushing zone and for later during the operating cycle when opened providing a means for a crushed canister to be driven by gravity from the crushing zone and a discharge mechanism for discharging severed connector plates and crushed canisters from the system.

Reference is made to FIG. 16 illustrating the hydraulic cylinder 210 driven driving means 207 at a preferred angle of approximately 22 degrees from vertical with movable wall 208 surface parallel to the axis of filter 203A in the crushing zone, essentially normal to the travel of the driving means along guide ways 213 and in alignment with sloping feed chute 201 and filters to be processed, 202 and 203. Waste oil pump cylinder 212, shown, is also driven by driving means 207 through an alignment coupling.

The operating cycle starts with escaping filter 203 into position 203A in the crushing zone. During the last: increment of return motion of the previous cycle, crushing zone entrance door 91 attached to a shaft supported in bearing 92A attached to bracket 92 in-turn attached to fixed wall frame 211, opened allowing filter 203 to be driven by gravity into the position of filter 203A. Filter 203A in the crushing zone rest against exit door 101 positioning it axially. Filter 202 in feed chute 201, is held from advancing by gripper foot 90A on arm 90 that presses firmly on filter 202 while filter 203 is escaped into the crushing zone. Next, hydraulic cylinder driven driving means 207 drives movable wall 208 lifting filter 203A against fixed wall 211. At a point that assures filter 203A is held between the movable wall and the fixed wall, crushing zone exit door 101 attached to shaft 110 supported in bearing 92B, swings clear of the crushing zone obviating interference with severing of the connector plate, see FIGS. 17 and 17A. As the driving means continues advancing, the spring loading of the movable wall collapses exposing blade 209 with "V-shaped" shearing edges (FIGS. 1A and 1B), fixed to the driving means, which applies a centering effect on the filter as the connector plate is severed during the driving means completion of its advance stroke crushing the filter canister squeezing out waste oil.

Figure 18:
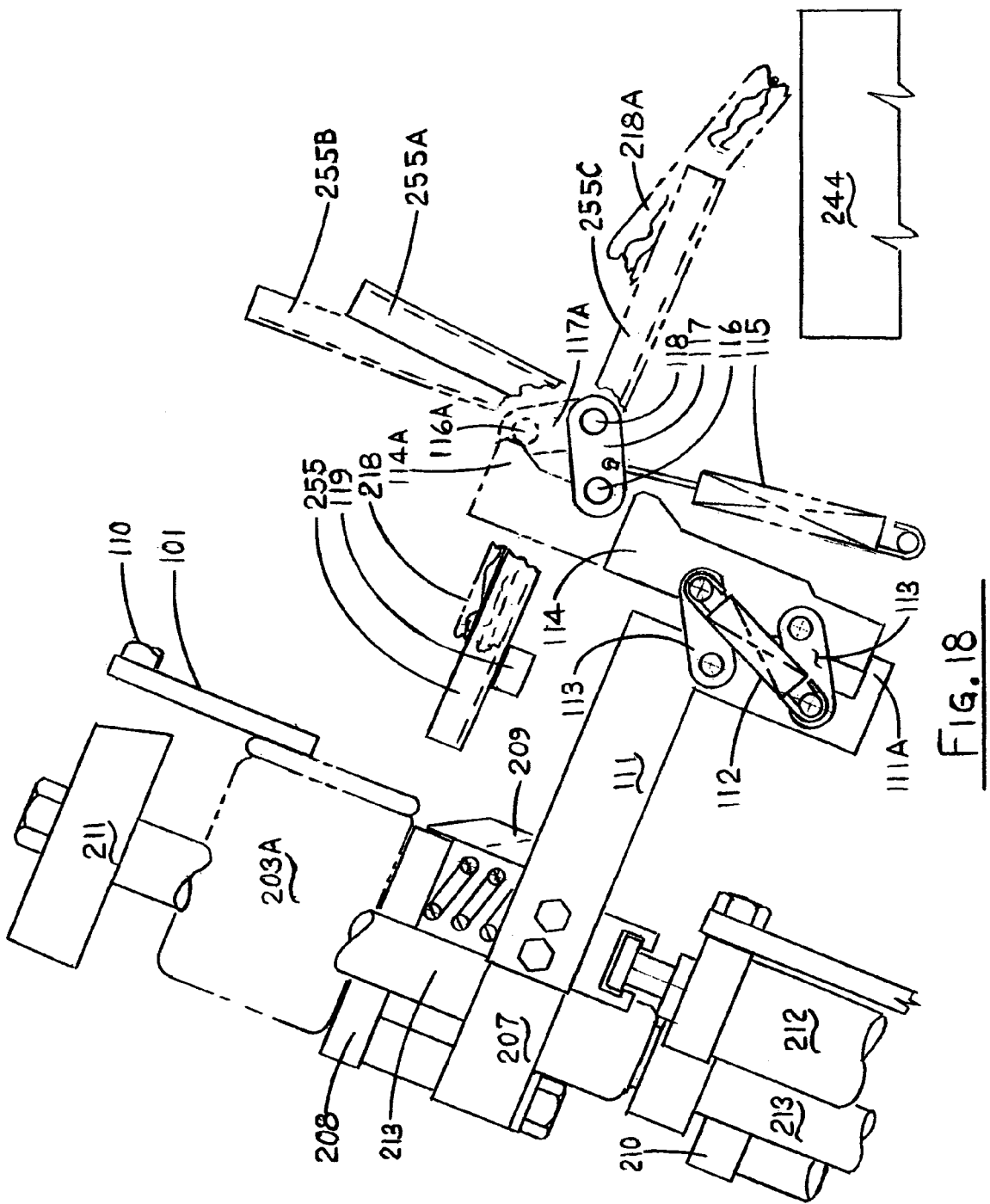
FIG. 18 is a side view showing a first alternate apparatus with mechanism for selectively discharging crushed filter canisters. A crushed canister is shown in phantom lines being discharged into a second separate container.
Figure 22:
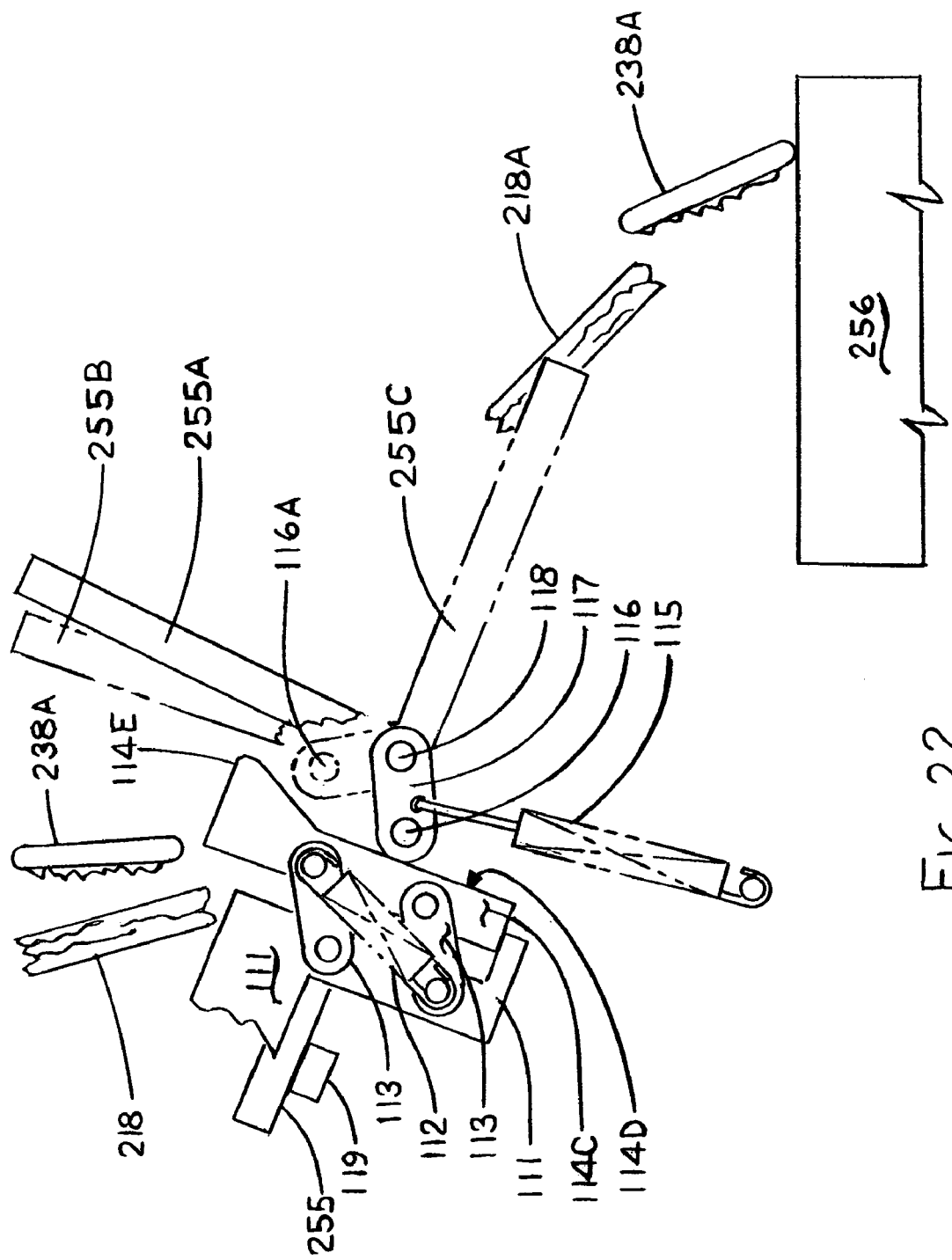
FIG. 22 is a side view showing a mechanism for the second alternate apparatus for directing severed connector plates and crushed canisters into a common container.

There are two (2) alternate methods and apparatus for collecting severed connector plates and crushed canisters. In the first alternate method and apparatus, crushed canisters and severed connector plates are segregated and directed into separated containers. In the second alternate method and apparatus, crushed canisters and severed connector plates are discharged into a common container. In operation, of the first alternate apparatus, a severed connector plate falls onto sloping tray 120 diverting it to a first separate container 240. See FIG. 19 which shows the connector plate diverted to a first separate container. The rounded lip on sloping tray 120 diverts waste oil away from container 240. A crushed canister, in the first alternate mechanism, is released from the crushing zone as the moving wall retracts to allowing the canister driven by gravity to slide out of the crushing zone onto discharge tray 255 from where it is discharged, during the first part of a subsequent cycle, into a second separate container 244 as depicted in FIG. 18. For the second alternate method and apparatus, collection tray 255 as depicted in FIG. 22 is positioned and sequenced so as to collect both the severed connector plate and the crushed canister and they would be discharged into a common container at the start of the subsequent driving means advance stroke similar to the previously depicted embodiments. In the second alternate apparatus, in FIG. 22, severed connector plates and crushed canisters are discharged from the system as tray 255 pivots on shaft 118 to position 255B dumping both processed filter components to the now sloping discharge tray 255C where they slide off into collection container 256. The first alternate method of segregating the processed components is preferred for more effective recycling of each component.

Figure 17:
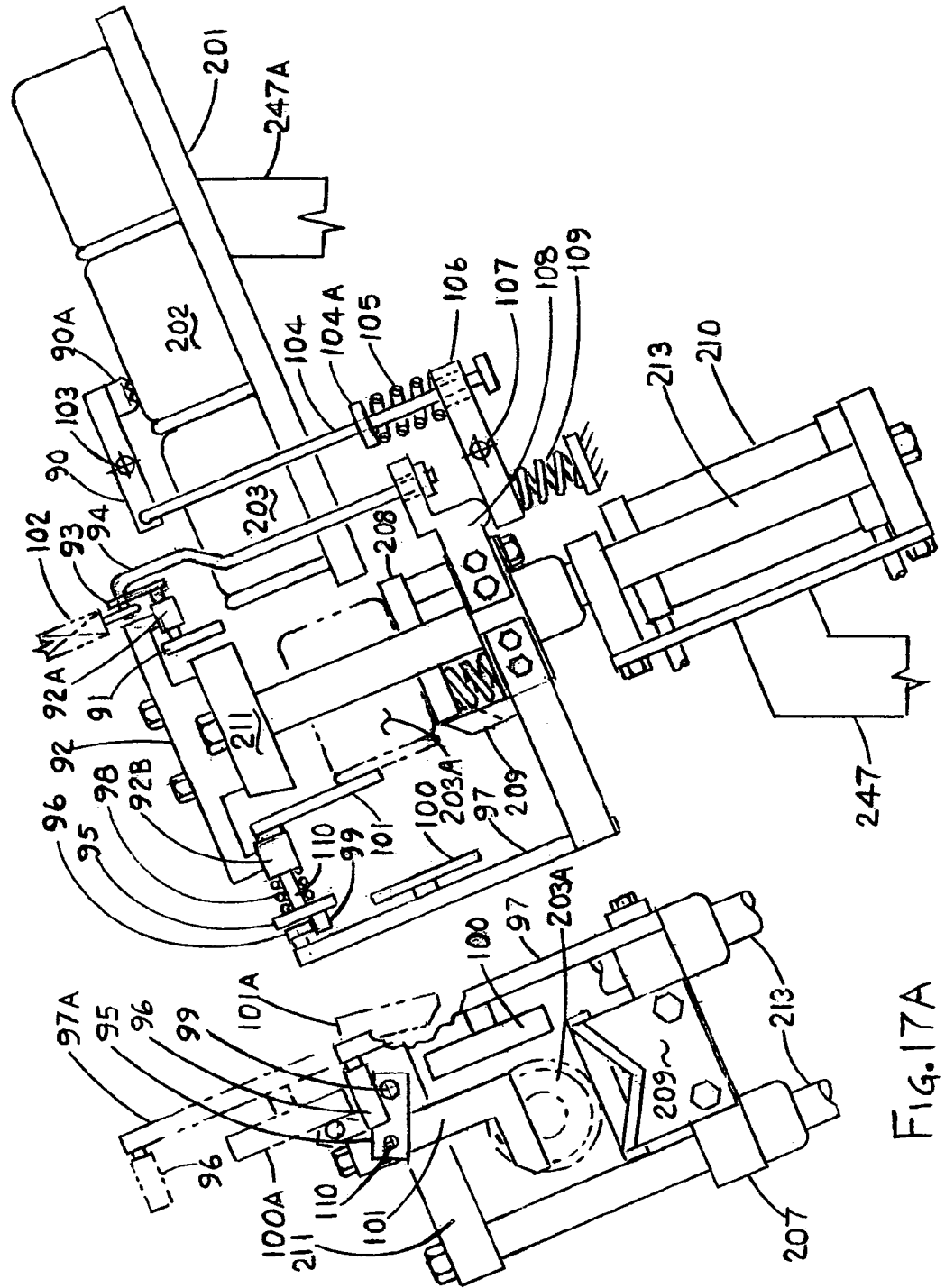
FIG. 17 is a view of the side opposite FIG. 16 showing mechanisms for the operation of the filter escapement entrance door, a gripper operating mechanism for holding the second filter back in the feed chute while the first filter is escaped into the crushing zone and a crushing zone exit door operating mechanism. Also shown is a frame with guide ways for the driving means and the movable wall.

The primary functions of feeding filters and escaping them into the crushing zone, severing the connector plate and crushing the canister squeezing out the waste oil are common for the first and second alternates. The operating sequence, controlled by a programmable logic controller (PLC), starts with the opening of the crushing zone entrance door 91 in the final increment of driving means 207 return stroke of a previous cycle and is actuated by arm 108 fixed to the driving means, as depicted in FIG. 17, which engages the collar fixed to the lower end of connecting rod 94 pulling downward on the connecting rod whose upper end is pivotally connected to arm 93 attached to a shaft supported in bearing 92A with entrance door 91 attached to the opposite end of the shaft so that as connecting rod 94 is pulled downward, arm 93 rotates the shaft and in turn swings the entrance door 91, fixed to the opposite end of the shaft to the open position, releasing filter 203 in the feed track which is driven by gravity into the crushing zone. Also during the final return increment of the driving means return stroke, arm 108 engages rocker arm 106 pivoting it counter-clockwise which in turn pushes upward on connecting rod 104 through spring 105 driving against collar 104A fixed to rod 104 whole upper end is pivotally connected to rocker arm 90 that pivots around axis 103 pressing gripper foot 90A against filter 202 holding it from moving as filter 203 advances into the crushing zone. Spring 105 on rod 104 provides compliance for different diameters of filters. As the driving means advances at the beginning of the subsequent cycle, arm 108 releases the downward force on rod 94 allowing tension spring 102 to pull upward on the rod rotating lever 93 and in turn rotating door 91 to the closed position. As door 91 closes, arm 108 releases the downward force on the end of rocker arm 106 allowing spring 109 to rotate rocker arm 106 clockwise engaging the collar fixed to the lower end of rod 104 pulling it downward rotating rocker arm 90 an increment counter-clockwise lifting gripper foot 90A from filter 202 allowing it driven by gravity (and filters behind it) to move forward until stopped by the now closed door 91 (see FIG. 16).

Crushing zone exit door 101 is also actuated by the travel of driving means 207. When the driving means is returned and a filter to be processed enters the crushing zone, exit door 101 is closed positioning the filter axially. As the driving means advances, the filter resting on movable wall 208 is pressed against fixed wall 211 gripping it. At this point, with the filter held between the fixed wall and the moving wall, and with driving means 207 continuing to advance, with bracket 97 fixed to the driving means and with cam bar 100 fixed to bracket 97, the cam bar, moving generally upward, engages pin 99 protruding from lever arm 95 causing arm 95 fixed to shaft 110 supported in bearing 92B to rotate shaft 110 which swings exit door 101, fixed to the opposite end of shaft 110, clear of the exit end of the crushing zone. Once the exit door has swung clear of the crushing zone, cam bar surface 100A slides along pin 99 maintaining the exit door at the open position as V-shaped blade 209 severs the filter connector plate (see FIGS. 17 and 17A) After a dwell period at the end of the driving means advance stroke during which pressure is held on the crushed canister, the driving means retracts relaxing the spring loaded movable wall releasing the crushed canister which is driven by gravity out of the crushing zone where it slides off the moving wall onto discharge tray 255. The exit door remains open past the point where cam bar 100 disengages pin 99 during the driving means return stoke so as to provide more exit door open time for the crushed canister to exit. Exit door 101 is held in the open position after retracting cam bar 100 disengages pin 99 by friction between the exit door 101 and bearing housing 92B applied by spring 98 biasing the door against the bearing housing. Finger 96 fixed to bracket 97 engages pin 99 during the last increment of the driving means return stroke rotating lever 95 closing the exit door. The closing of the exit door and the opening of entrance door are sequenced so the exit door is closed before the entrance door opens letting the next filter into the crushing zone.

FIG. 18 illustrates a mechanism for discharging processed filter components from the system. The mechanism as depicted is for the first alternate method for discharging crushed filter canisters only into a first separate container; however, it can be seen that with minor changes in the mechanism and the sequence of operation, both the connector plate and the crushed canister could be discharged into a common second alternated method container (see FIG. 22). In many situations, it is desirable to segregate severed connector plates from crushed canisters for further recycling so that following description of the sequence of operation for discharging processed filter components as depicted in FIGS. 18 through 21 is directed to segregating severed connector plates from crushed canisters. At the start of a cycle, discharge tray 255 will have a crushed canister from the previous cycle. As driving means 207 starts its advance stoke, cam bar 114 attached by parallel links 113 to arm 111 which is fixed to the driving means, engages pin 116 protruding from discharge tray lever arm 117 driving pin 116 in an upward arc. Lever arm 117 is fixed to shaft 118 which in turn is fixed to trays assembly 255 and 255A. When pin 116 is driven in an upward arc to position 116A, shown in phantom, rotating rays 255 and 255A clockwise, it tumbles the crushed canister from tray 255 to tray 255A where it slides off into second separate container 244. The nose of cam bar 114 passes pin 116 after a short increment of travel after which tension spring 115 pulling on arm 117 rotates trays 255 and 255A counter clockwise to an intermediate position with pin 116 resting against cam bar surface 114B as depicted in FIG. 19. The attitude of tray 255A, as depicted in FIG. 19, prevents residual waste oil from draining off tray 255A into container 244. At this same intermediate position, tray 255 avoids interference with the severed connector plate 238 as it falls onto sloping tray 120 and slides off into first separate container 240. Cam bar surface 114B slides along discharge tray lever pin as the cam bar moves with further advancing of the driving means without changing the attitude of the discharge trays until the driving means approaches the end of its advancing stroke where a small relief in cam surface 114A passes by pin 116 as seen in FIG. 20 allowing spring 115 to rotate lever 117 and the discharge trays a small amount counter clockwise resting the pin on the lower relieved portioned of cam surface 114B. During the first increment of the driving means return stroke, tray lever pin 116 is engaged by the step in cam surface 114B between the relieved lower surface and the upper surface which drives against pin 116 rotating the lever 117 and the discharge trays counter clockwise (see FIG. 20). As this occurs, pin 116 travels "over center" and the cam bar attached to arm 111 by parallel links 113 gives way moving in a generally left direction overcoming tension spring 112. Tension spring 115 returns discharge trays to the full counter clockwise position with tray 255 resting on stop bar 119 as the driving means continues its retract stroke. The sequencing of the discharge trays to their return position is before a crushed canister is released from the crushing zone. When the retracted moving wall releases the crushed canister 218, it slides driven by gravity onto tray 255 which as, described above, has already returned. The driving means completes its return stroke and cam bar 114 attached by parallel links 113 gives way overcoming tension spring 112 as the nose of the cam bar rides over pin 116 resetting to the position depicted in FIG. 18 completing one (1) cycle. The cycle controlled by a PLC as previously described repeats automatically.

While the present invention is described herein with reference to illustrated embodiments, it should be understood that the invention is not limited hereto. Those having ordinary skill in the art and access to the teachings herein will recognize additional modifications and embodiments within the scope thereof. Therefore, the present invention is limited only by the claims attached herein.

We claim:

1. An apparatus for automatically processing multiple used oil filters, for an engine using oil for lubrication, by shearing a connector plate of each filter from a canister and then crushing the canister which comprises:
    (a) a fixed wall mounted on a frame;
    (b) a movable wall mounted on the frame against which the used oil filter is positioned in a crushing zone and which movable wall is movable by a driving means in the crushing zone to crush the filter against the fixed wall, and which is retracted by the driving means from the crushing zone, wherein the walls have crushing surfaces which are at an acute angle to the horizontal and wherein a longitudinal axis of the filter is at the first acute angle to horizontal on the movable wall;
    (c) blade means mounted adjacent to the movable wall, which is exposed by movement of the movable wall against the filter, so as to move to shear the connector plate from the canister as the movable wall crushes the canister against the fixed wall;
    (d) a feed chute mounted on the frame at another acute angle to horizontal with a first escapement means for individually and automatically feeding the oil filters to the crushing zone between the walls, wherein a retaining means holds a succeeding oil filter of the multiple filters away from the crushing zone until the crushed canister and the sheared connector plate have been removed from the crushing zone of the apparatus;
    (e) a second escapement means for retaining the oil filter in the crushing zone during the crushing and then allowing at least the crushed canister and connector plate to be removed from the crushing zone; and (f) a tray device mounted on the frame adjacent to the crushing zone for removing and transferring at least the crushed canister from the apparatus.

2. The apparatus of claim 1 wherein the first and second escapement means are activated by mechanisms actuated by movement of the driving means.

3. The apparatus of claim 1 wherein the tray device is operable and pivotally mounted on the frame to provide the transfer.

4. The apparatus of claims 1, 2 or 3 wherein the tray device is actuated by movement of the driving means.

5. The apparatus of claims 1 or 2 wherein a container for the used oil removed from the crushed canister is mounted under the frame adjacent to the crushing zone and wherein the container is connected to a pump for pumping the used oil to a storage container.

6. The apparatus of claim 5 wherein the waste oil pump is activated by movement of the driving means.

7. The apparatus of claims 1, 2 or 3 wherein the driving means is controlled by a programmable logic controller (PLC).

8. The apparatus of claim 7 wherein the tray device has a lip to divert oil from the oil filter into a reservoir.

9. The apparatus of claim 1 wherein the blade means has a V-shaped cutting edge which engages the canister.

10. The apparatus of claim 1 wherein the tray device has a lip to divert oil from the oil filter into a reservoir.

11. The apparatus of claim 1 wherein the tray device is stationary.

12. A process for automatically processing used oil filters of the type used in an engine which comprises:
(a) advancing the filters with a multiple filter feed chute mounted at an acute angle to horizontal on a frame of an apparatus with an escapement means for metering one filter at a time from the chute into a crushing zone with a fixed wall and a movable wall at the acute angle;
(b) introducing the one of the filters into the crushing zone on the movable wall one at a time using the escapement means, wherein a longitudinal axis of the filter is at another acute angle to horizontal;
(c) removing a filter connector base plate from a canister of the filter in the crushing zone by a guillotine like shearing action of a blade means mounted adjacent the movable wall which enters the crushing zone during the removing and also compressing the canister of the filter to a crushing pressure between the walls, thereby extracting residual oil from the canister and filter element, wherein the removing and compressing is with the movable wall which moves towards the fixed wall in the crushing zone, which movement exposes the blade means mounted adjacent the movable wall so that the blade means moves to shear the connector base plate from the filter and so that the walls crush the canister in the crushing zone; and
(d) discharging the connector plate, crushed canister and filter element from the apparatus onto a tray device mounted on the frame for removing and transferring the crushed canister and optionally the severed connector plate out of the apparatus.

13. The process of claim 12 wherein the removing and transferring is accomplished by the tray device so that one or both of the crushed canister and sheared connector plate are transferred.

14. The process of claim 13 wherein the connector plate drops from the apparatus to a select location so that only the crushed canister is transferred by the tray device.

15. The process of claim 12 wherein the blade means has a V-shaped cutting edge which engages the canister.

16. The process of claim 12 wherein the tray device is stationary.

17. An apparatus for automatically processing used oil filters of the type used in an engine comprising:
(a) a multiple filter feed chute mounted on a frame such that a longitudinal axis of a canister is at an acute angle to horizontal, with an escapement for metering one filter at a time from the chute into a crushing zone provided with a blade means, which blade means enters the crushing zone during the removal and removes a connector plate from a canister of the filter by a guillotine like shearing action of the blade means, wherein a first wall adjacent which the blade is mounted is moved towards a second wall to expose the blade, each wall provided with a surface which is at another acute angle to horizontal in the crushing zone so that the blade means shears the connector base plate from the filter and the walls crush the canister in the crushing zone, thereby extracting residual oil from the filter element and discharging the crushed canister, filter element and the connector plate from the crushing zone.

18. The apparatus of claim 17 wherein the blade means has a V-shaped cutting edge which engages the canister.

* * * * *

UNITED STATES PATENT AND TRADEMARK OFFICE
CERTIFICATE OF CORRECTION

| | | |
|---|---|---|
| PATENT NO. | : 7,162,786 B2 | Page 1 of 1 |
| APPLICATION NO. | : 10/913187 | |
| DATED | : January 16, 2007 | |
| INVENTOR(S) | : Edwin E. Rice and Charles H. Franklin | |

It is certified that error appears in the above-identified patent and that said Letters Patent is hereby corrected as shown below:

Column 2, line 27, "are crusher squeezing" should be --are crushed squeezing--.

Column 2, line 40, "crush the filer" should be --crush the filter--.

Column 3, line 15, "apparatus onto: a tray" should be --apparatus onto a tray--.

Column 11, line 62, "shows the filer" should be --shows the filter--.

Column 15, line 51, "rotating rays 255" should be --rotating trays 255--.

Signed and Sealed this

Fifth Day of June, 2007

JON W. DUDAS
*Director of the United States Patent and Trademark Office*